US012580179B2

(12) United States Patent
Toma et al.

(10) Patent No.: US 12,580,179 B2
(45) Date of Patent: *Mar. 17, 2026

(54) METAL COMPOSITE HYDROXIDE AND METHOD FOR PRODUCING SAME, POSITIVE ELECTRODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Takahiro Toma, Niihama (JP); Haruki Kaneda, Niihama (JP); Yuki Koshika, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1069 days.

This patent is subject to a terminal disclaimer.

(21) Appl. No.: 16/975,304

(22) PCT Filed: Feb. 20, 2019

(86) PCT No.: PCT/JP2019/006392
§ 371 (c)(1),
(2) Date: Aug. 24, 2020

(87) PCT Pub. No.: WO2019/163845
PCT Pub. Date: Aug. 29, 2019

(65) Prior Publication Data
US 2021/0384490 A1 Dec. 9, 2021

(30) Foreign Application Priority Data

Feb. 22, 2018 (JP) ................................ 2018-029555

(51) Int. Cl.
*H01M 4/36* (2006.01)
*C01G 53/04* (2025.01)
(Continued)

(52) U.S. Cl.
CPC ............ *H01M 4/366* (2013.01); *C01G 53/04* (2013.01); *C01G 53/50* (2013.01);
(Continued)

(58) Field of Classification Search
CPC .... H01M 4/366; H01M 4/0471; H01M 4/505; H01M 4/525; H01M 2004/021;
(Continued)

(56) References Cited

U.S. PATENT DOCUMENTS

2002/0192552 A1* 12/2002 Lampe-Onnerud ........................ H01M 4/1391
429/231.9
2002/0192556 A1 12/2002 Lampe-Onnerud et al.
(Continued)

FOREIGN PATENT DOCUMENTS

CN 105359314 A 2/2016
CN 105934409 A 9/2016
(Continued)

OTHER PUBLICATIONS

English machine translation of the description of Toya et al. (corresponds to JP 2012256435 A, as cited in the Jan. 12, 2021 IDS) (Year: 2012).*

(Continued)

*Primary Examiner* — Jessie Walls-Murray
(74) *Attorney, Agent, or Firm* — WHDA, LLP

(57) ABSTRACT

A metal composite hydroxide represented by a general formula (1): $Ni_{1-x-y}Co_xMn_yM_z(OH)_{2+\alpha}$ (where $0.02 \leq x \leq 0.3$, $0.02 \leq y \leq 0.3$, $0 \leq z \leq 0.05$, and $-0.5 \leq \alpha \leq 0.5$ are satisfied and M is at least one element selected from the group consisting of (Continued)

Mg, Ca, Al, Si, Fe, Cr, V, Mo, W, Nb, Ti, and Zr), in which the metal composite hydroxide contains a first particle having a core portion inside the particle and a shell portion formed around the core portion and [(D90–D10)/MV] is 0.80 or more.

11 Claims, 7 Drawing Sheets

(51) Int. Cl.

| | |
|---|---|
| *C01G 53/50* | (2025.01) |
| *H01M 4/02* | (2006.01) |
| *H01M 4/04* | (2006.01) |
| *H01M 4/505* | (2010.01) |
| *H01M 4/525* | (2010.01) |

(52) U.S. Cl.
CPC ......... *H01M 4/0471* (2013.01); *H01M 4/505* (2013.01); *H01M 4/525* (2013.01); *C01P 2004/04* (2013.01); *C01P 2004/51* (2013.01); *C01P 2006/11* (2013.01); *H01M 2004/021* (2013.01); *H01M 2004/028* (2013.01)

(58) Field of Classification Search
CPC ........... H01M 2004/028; H01M 4/131; H01M 4/1391; H01M 10/0525; C01G 53/04; C01G 53/50; C01G 53/82; C01G 53/42; C01P 2004/04; C01P 2004/51; C01P 2006/11; C01P 2002/54; C01P 2002/85; C01P 2004/61; C01P 2004/84; C01P 2006/12; C01P 2006/37; Y02E 60/10
See application file for complete search history.

(56) References Cited

U.S. PATENT DOCUMENTS

| | | | | |
|---|---|---|---|---|
| 2009/0272939 A1* | 11/2009 | Sun | H01M 4/366 | 252/182.1 |
| 2013/0149608 A1* | 6/2013 | Kim | H01M 4/366 | 429/223 |
| 2014/0038053 A1* | 2/2014 | Endo | H01M 4/0471 | 429/223 |
| 2016/0056450 A1* | 2/2016 | Yoshikawa | H01M 4/131 | 429/224 |
| 2016/0126548 A1 | 5/2016 | Schroedle et al. | | |
| 2016/0172663 A1* | 6/2016 | Saka | H01M 4/525 | 429/223 |
| 2016/0181597 A1* | 6/2016 | Kim | H01M 4/582 | 429/223 |
| 2017/0012288 A1 | 1/2017 | Yamaji et al. | | |
| 2017/0222221 A1* | 8/2017 | Park | H01M 4/366 | |

FOREIGN PATENT DOCUMENTS

| | | |
|---|---|---|
| JP | 2012-256435 A | 12/2012 |
| JP | 2014-40363 A | 3/2014 |
| JP | 2017-154916 A | 9/2017 |
| JP | 2017-210395 A | 11/2017 |
| WO | 2002/103824 A2 | 12/2002 |

OTHER PUBLICATIONS

Sun et al., "High-energy cathode material for long-life and safe lithium batteries", Nature Materials | vol. 8 | Apr. 2009, pp. 320-324, DOI: 10.1038/NMAT2418 (Year: 2009).*

Annotated Figure 2c from Sun et al. ("High-energy cathode material for long-life and safe lithium batteries", 2009, DOI: 10.1038/NMAT2418)—Figure 2c was annotated by examiner on Nov. 25, 2024 as supporting evidence, showing radii ratio calculations (Year: 2024).*

Lee et al., "Effect of outer layer thickness on full concentration gradient layered cathode material for lithium-ion batteries", Journal of Power Sources 273 (2015) 663e669, http://dx.doi.org/10.1016/j.jpowsour.2014.09.161 (Year: 2015).*

Lee et al., "Effect of outer layer thickness on full concentration gradient layered cathode material for lithium-ion batteries", Journal of Power Sources 273 (2015) pp. 663-669, http://dx.doi.org/10.1016/j.jpowsour.2014.09.161 (Year: 2015).*

Hou et al., Core-shell and concentration-gradient cathodes prepared via co-precipitation reaction for advanced lithium-ion batteriesJ. Mater. Chem. A, 2017, 5, 4254-4279, DOI: 10.1039/c6ta10297b (Year: 2017).*

Liao et al., Core/Double-Shell Type Gradient Ni-Rich LiNi0.76Co0.10Mn0.14O2 with High Capacity and Long Cycle Life for Lithium-Ion Batteries, ACS Appl. Mater. Interfaces 2016, 8, 24543-24549, DOI: 10.1021/acsami.6b06172 (Year: 2016).*

Extended (Supplementary) European Search Report dated Oct. 20, 2021, issued in counterpart EP Application No. 19756592.2. (7 pages).

Zhang, Y et al., "Facile synthesis of a novel structured Li[Ni0.66Co0.1Mn0.24]O2 cathode material with improved cycle life and thermal stability via ion diffusion", Journal of Power Sources, 2016, vol. 327, pp. 38-43, cited in Extended (Supplementary) European Search Report dated Oct. 20, 2021. (6 pages).

International Search Report dated May 21, 2019, issued in counterpart Application No. PCT/JP2019/006392, with English Abstract. (4 pages).

International Preliminary Report on Patentability (Form PCT/IB/373) issued in counterpart International Application No. PCT/JP2019/006392 dated Aug. 27, 2020, with Form PCT/ISA/237. (14 pages).

Office Action dated Jul. 21, 2022, issued in counterpart Chinese Patent Application No. 201980014631.X, with English translation. (23 pages).

Office Action dated May 13, 2024, issued in counterpart CN application No. 201980014631.x, with English translation. (54 pages).

Office Action dated Dec. 19, 2025, issued in counterpart EP Application No. 19756592.2. (6 pages).

* cited by examiner

METAL COMPOSITE HYDROXIDE AND METHOD FOR PRODUCING SAME, POSITIVE ELECTRODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY

TECHNICAL FIELD

The present invention relates to a metal composite hydroxide and a method for producing the same, a positive electrode active material for non-aqueous electrolyte secondary battery and a method for producing the same, and a non-aqueous electrolyte secondary battery.

BACKGROUND ART

In recent years, it is strongly desired to develop small-sized and lightweight secondary batteries having a high energy density in association with the widespread use of portable electronic devices such as mobile phones and notebook personal computers. It is strongly desired to develop secondary batteries having an excellent energy density as a battery for xEV mainly for electric cars.

As secondary batteries satisfying such requirements, there are lithium ion secondary batteries which are one of non-aqueous electrolyte secondary batteries. Lithium ion secondary batteries include a negative electrode, a positive electrode, a non-aqueous electrolyte and the like. As active materials used as the materials for the negative electrode and the positive electrode, materials capable of de-inserting and inserting lithium are used.

Lithium ion secondary batteries are currently under active research and development. Particularly, lithium ion secondary batteries containing a layered or spinel type lithium metal composite oxide as a positive electrode material can provide a high voltage of 4 V-class and thus are put to practical use as a battery having a high energy density.

Examples of main positive electrode materials which have been proposed so far include a lithium-cobalt composite oxide ($LiCoO_2$) that is relatively easily synthesized, a lithium-nickel composite oxide ($LiNiO_2$) containing nickel that is more inexpensive than cobalt, a lithium-nickel-cobalt-manganese composite oxide ($LiNi_{1/3}Co_{1/3}Mn_{1/3}O_2$), and a lithium-manganese composite oxide ($LiMn_2O_4$) containing manganese.

In order to obtain a lithium ion secondary battery having an excellent energy density, the positive electrode active material is required to have a high charge and discharge capacity. A lithium-nickel composite oxide has a lower electrochemical potential than a lithium-cobalt composite oxide and increased changes in the transition metal valence contributing to charge and discharge and thus enables capacity enlargement of secondary battery but is inferior to a lithium-cobalt composite oxide or a lithium-nickel-cobalt-manganese composite oxide in thermal stability. Hence, some techniques have been proposed to improve battery characteristics by having different compositions of the particles constituting a lithium-metal composite oxide or a precursor thereof on the surface of and inside the particles.

For example, Patent Literature 1 proposes nickel-manganese composite hydroxide particles which are a precursor of a positive electrode active material for non-aqueous electrolyte secondary battery and a nickel-manganese composite hydroxide represented by a general formula: $Ni_xMn_yCo_zM_t$ $(OH)_{2+\alpha}$ (x+y+z+t=1, $0.3 \le x \le 0.7$, $0.1 \le y \le 0.55$, $0 \le z \le 0.4$, $0 \le t \le 0.1$, $-0.5 \le \alpha \le 0.5$, and M is one or more additive elements selected from the group consisting of Al, Ti, V, Cr, Zr, Nb, Hf, Ta, Mo, and W,) and in which [(D90–D10)/MV], that is an index indicating the spread of particle size distribution, is 0.55 or less, and the particles have a multilayer structure in which the composition at the inner section of the secondary particles is different from that at the outer section, and the Mn/Ni ratio in the composition at the outer section of the secondary particles is higher than that in the composition at the inner section. According to Patent Literature 1, it is said that the nickel-manganese composite hydroxide particles exhibit high particle size uniformity and have a decreased alkalinity as an active material as well as enable a secondary battery to have a high capacity and a high output when being used in the secondary battery.

Patent Literature 2 proposes a composition having a) a nucleus having an empirical formula: $Li_xM'_zNi_{1-y}M''_yO_2$ (where x is greater than about 0.1 and about 1.3 or less, y is greater than about 0.0 and about 0.5 or less, z is greater than about 0.0 and about 0.2 or less, M' is at least one element selected from the group consisting of sodium, potassium, calcium, magnesium, and strontium, and M'' is at least one element selected from the group consisting of cobalt, iron, manganese, chromium, vanadium, titanium, magnesium, silicon, boron, aluminum, and gallium) and b) a coating having a higher cobalt/nickel ratio than the nucleus. According to Patent Literature 2, it is said that the composition exhibits improved capacity, cycle characteristics, and safety as compared to the corresponding $LiCoO_2$ and $LiNiO_2$.

Patent Literature 3 proposes a particulate composite oxide represented by the following formula (1): $Li_xMeO_{2+0.5(x-1)}$ (1) (in the formula, Me is a transition metal including Ni and at least one metal selected from other transition metals, and x represents a number greater than 1.00 and 1.25 or less), in which the atomic ratio (A=Ni/Me×100) of Ni to Me is 60 mol % or more and 90 mol % or less throughout the particle and the value of the atomic ratio at the peripheral section is smaller than that at the center. According to Patent Literature 3, it is said that the composite oxide is used as a highly safe positive electrode active material which exhibits excellent capacity characteristics and is thermally stable.

CITATION LIST

Patent Literature

Patent Literature 1: JP 2012-256435 A
Patent Literature 2: WO 2002/103824 A
Patent Literature 3: JP 2014-040363 A

SUMMARY OF INVENTION

Technical Problem

The lithium-metal composite oxide or its precursor described in Patent Literatures 1 to 3 above has different compositions on the surface of particles and inside the particles and thus exhibits improved battery characteristics, but secondary batteries are required to exhibit further improved charge and discharge capacity and energy density and exhibit improved thermal stability.

One of the methods for improving the energy density of secondary battery is to widen the particle size distribution width of positive electrode active material. This is because by widening the particle size distribution of positive electrode active material, the positive electrode active material exhibits excellent filling property when being formed into an electrode plate and thus the amount of active material per unit volume, namely, the charge and discharge capacity can be increased. However, when the particle size distribution width is widened, the number of particles having a relatively small particle size increases. Such particles having a small particle size have a high ratio of the surface to the entire bulk and thus have a problem that the thermal stability and the like decrease. Hitherto, the characteristics of a material having an improved surface composition in a lithium-metal composite oxide having a wide particle size distribution and suitable conditions for the production method of the lithium-metal composite oxide have not been reported.

Furthermore, in association with the increasing demand for secondary batteries, there is a demand for a positive electrode active material having a property (weather resistance) that the positive electrode active material hardly undergoes alteration due to atmospheric moisture or gas during the production process and storage of secondary batteries, but Patent Literatures 1 to 3 above do not discuss the weather resistance.

In view of the above problems, an object of the present invention is to provide a positive electrode active material which achieves a high charge and discharge capacity, high thermal stability, and weather resistance in a secondary battery at higher levels, and a precursor thereof. Another object of the present invention is to provide a method for producing this positive electrode active material and a precursor thereof, which enables easy production on an industrial scale. Another object of the present invention is to provide a secondary battery fabricated using such a positive electrode active material.

Solution to Problem

The present inventors have conducted extensive investigations to solve the above problems and, as a result, found out that a secondary battery fabricated using a lithium-metal composite oxide having a specific core-shell structure having different Ni ratios on the particle surface and inside the particle and particle size distribution controlled in a specific range as a positive electrode active material has a high charge and discharge capacity and also exhibit excellent weather resistance and thermal stability. Furthermore, the present inventors have found out that a lithium-metal composite oxide (positive electrode active material) having powder characteristics as described above can be obtained by using a metal composite hydroxide controlled to have an internal particle composition and particle size distribution in specific ranges as a precursor.

In a first aspect of the present invention, a metal composite hydroxide is provided which is represented by a general formula (1): $Li_{1+a1}Ni_{1-x1-y1}Co_{x1}Mn_{y1}M_{z1}O_{2+\beta1}$ (where $0.02 \leq x \leq 0.3$, $0.02 \leq y \leq 0.3$, $0 \leq z \leq 0.05$, $-0.5 \leq \alpha \leq 0.5$ are satisfied and M is at least one element selected from the group consisting of Mg, Ca, Al, Si, Fe, Cr, V, Mo, W, Nb, Ti, and Zr), and in which [(D90–D10)/MV] that indicates a dispersion of a particle size in particle size distribution calculated by D90, D10 and a volume average particle diameter (MV) by a laser diffraction scattering method is 0.80 or more, the metal composite hydroxide contains a first particle having a core portion inside the particle and a shell portion formed around the core portion, a composition of the core portion is represented by a general formula (2): $Ni_{1-x1-y1}Co_{x1}Mn_{y1}M_{z1}(OH)_{2+\alpha1}$ (where $0.4 < (1-x_1-y_1) \leq 0.96$, $0 \leq z_1 \leq 0.05$, $-0.5 \leq \alpha_1 \leq 0.5$ are satisfied), a composition of the shell portion is represented by a general formula (3): $Ni_{1-x2-y2}Co_{x2}Mn_{y2}M_{z2}(OH)_{2+\alpha2}$ (where $(1-x_1-y_1)/(1-$ $x_2-y_2)>1.0$, $0<(1-x_2-y_2)<0.6$, $0 \leq z_2 \leq 0.05$, $-0.5 \leq \alpha_2 \leq 0.5$ are satisfied), and the shell portion has a thickness to be 10% or more and 40% or less of a radius of the first particle in a direction from a surface to a center of the particle in the first particle having a particle size in a range to be ±10% of the volume average particle diameter (MV).

It is preferable that the metal composite hydroxide has a volume average particle diameter (MV) of 5 μm or more and 20 μm or less. It is preferable that the element M is uniformly present inside the first particle and/or on the surface of the first particle.

In a second aspect of the present invention, a method for producing a metal composite hydroxide that contains a first particle having a core portion inside the particle and a shell portion formed around the core portion and is represented by a general formula (1): $Ni_{1-x-y}Co_xMn_yM_z(OH)_{2+\alpha}$ (where $0.02 \leq x \leq 0.3$, $0.02 \leq y \leq 0.3$, $0 \leq z \leq 0.05$, $-0.5 \leq \alpha \leq 0.5$ are satisfied and M is at least one element selected from the group consisting of Mg, Ca, Al, Si, Fe, Cr, V, Mo, W, Nb, Ti, and Zr) is provided which includes a first crystallization process of supplying a first raw material aqueous solution containing nickel and at least one of cobalt, manganese, or the element M, adjusting a pH value of a reaction aqueous solution to 11.5 or more and 13.5 or less at a liquid temperature of 25° C., and performing crystallization to form the core portion represented by a general formula (2): $Ni_{1-x1-y1}Co_{x1}Mn_{y1}M_{z1}(OH)_{2+\alpha1}$ (where $0.4 < (1-x_1-y_1) \leq 0.96$, $0 \leq z_1 \leq 0.05$, $-0.5 \leq \alpha_1 \leq 0.5$ are satisfied): and a second crystallization process of supplying a second raw material aqueous solution having a lower nickel content than the first raw material aqueous solution to a reaction aqueous solution that contains the core portion and has a pH value adjusted to be 10.5 or more and 12.0 or less at a liquid temperature of 25° C. and lower than the pH value in the first crystallization process and forming the shell portion represented by a general formula (3): $Ni_{1-x2-y2}CO_{x2}Mn_{y2}M_{z2}(OH)_{2+\alpha2}$ (where $(1-x_1-y_1)/(1-x_2-y_2)>1.0$, $0<(1-x_2-y_2)<0.6$, $0 \leq z_2 \leq 0.05$, $-0.5 \leq \alpha_2 \leq 0.5$ are satisfied) around the core portion, and in which the first crystallization process is performed by a continuous crystallization method in which a deposited product is collected by an overflow method and the second crystallization process is performed by a batch crystallization method, and the first crystallization process and the second crystallization process are performed by adjusting amounts of the first raw material aqueous solution and second raw material aqueous solution supplied so that the shell portion has a thickness to be 10% or more and 40% or less of a radius of the first particle in a direction from a surface to a center of the first particle in the first particle having a particle size in a range to be ±10% of a volume average particle diameter (MV) of the metal composite hydroxide.

In a third aspect of the present invention, a positive electrode active material for non-aqueous electrolyte secondary battery is provided which contains a lithium-metal composite oxide represented by a general formula (4): $Li_{1+a}Ni_{1-x-y}Co_xMn_yM_zO_{2+\beta}$ (where $-0.05 \leq a \leq 0.50$, $0.02 \leq x \leq 0.3$, $0.02 \leq y \leq 0.3$, $0 \leq z \leq 0.05$, $-0.5 \leq \beta \leq 0.5$, and M is at least one element selected from the group consisting of Mg, Ca, Al, Si, Fe, Cr, V, Mo, W, Nb, Ti, and Zr), and in which [(D90–D10)/MV] that indicates a dispersion of a particle size in particle size distribution calculated by D90, D10 and the volume average particle diameter (MV) by a laser diffraction scattering method is 0.80 or more, the lithium-metal composite oxide contains a second particle having a core portion inside the particle and a shell portion formed around the core portion, a composition of the core portion in the second particle is represented by a general formula (5) $Li_{1+a1}Ni_{1-x1-y1}Co_{x1}Mn_{y1}M_{z1}O_{2+\beta1}$ (where $-0.05 \leq a \leq 0.50$, $0.4 < (1-x_1-y_1) \leq 0.96$, $0 \leq z_1 \leq 0.05$, and $-0.5 < \beta_1 \leq 0.5$ are satisfied), a composition of the shell portion in the second particle is represented by a general formula (6): $Li_{1+a2}Ni_{1-x2-y2}Co_{x2}Mn_{y2}M_{z2}O_{2+\beta2}$ (where $-0.05 \leq a_2 \leq 0.50$, $(1-x_1-y_1)/(1-x_2-y_2) > 1.0$, $0 < (1-x_2-y_2) < 0.6$, $0 \leq z_2 \leq 0.05$, $-0.5 \leq \beta_2 \leq 0.5$ are satisfied), and the shell portion has a thickness to be 10% or more and 40% or less of a radius of the second particle in a direction from a surface to a center of the second particle in the second particle having a particle size in a range to be ±10% of the volume average particle diameter (MV).

It is preferable that the positive electrode active material for non-aqueous electrolyte secondary battery has a tap density of 2.0 $g/cm^3$ or more and a volume average particle diameter (MV) of 5 μm or more 20 μm or less in particle size distribution by a laser diffraction scattering method. It is preferable that the element M is uniformly distributed inside the lithium-metal composite oxide and/or covers at least a part of a surface of the lithium-metal composite oxide.

In a fourth aspect of the present invention, a method for producing a positive electrode active material for non-aqueous electrolyte secondary battery is provided which includes a mixing process of mixing the metal composite hydroxide described above with a lithium compound to obtain a lithium mixture; and a firing process of firing the lithium mixture in an oxidizing atmosphere at 650° C. or more and 900° C. or less.

In a fifth aspect of the present invention, a method for producing a positive electrode active material for non-aqueous electrolyte secondary battery is provided which includes a heat treatment process of subjecting the metal composite hydroxide described above to a heat treatment; a mixing process of mixing a lithium compound with at least either of a metal composite hydroxide or a metal composite oxide obtained after the heat treatment to obtain a lithium mixture; and a firing process of firing the lithium mixture in an oxidizing atmosphere at 650° C. or more and 900° C. or less.

In a sixth aspect of the present invention, a non-aqueous electrolyte secondary battery is provided which includes a positive electrode containing the positive electrode active material described above, a negative electrode, and a non-aqueous electrolyte.

Advantageous Effects of Invention

According to the present invention, it is possible to obtain a positive electrode active material which achieves a high charge and discharge capacity, high thermal stability, and weather resistance in a secondary battery at higher levels when being used as a positive electrode material of a secondary battery, and a precursor thereof. The production method of the present invention enables easy production of the positive electrode active material described above and a precursor thereof on an industrial scale, and the industrial value of the production method is extremely great.

DESCRIPTION OF EMBODIMENTS

Figure 1:
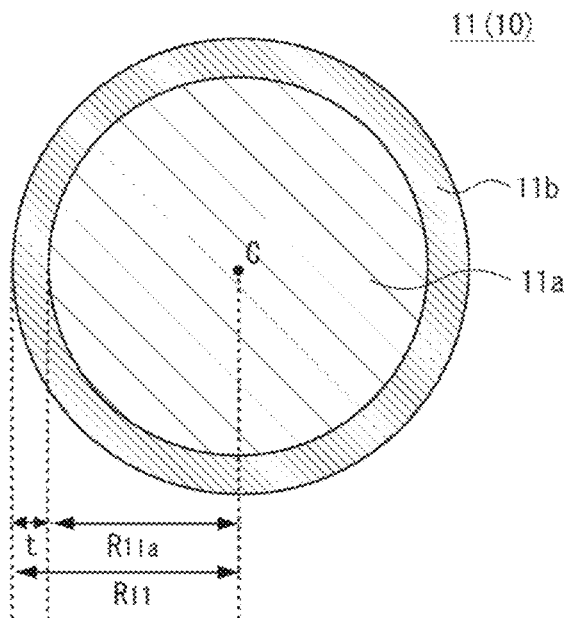
FIG. 1 is a schematic diagram illustrating an example of a metal composite hydroxide of the present embodiment.

Hereinafter, a metal composite hydroxide and a method for producing the same, a positive electrode active material for non-aqueous electrolyte secondary battery and a method for producing the same, and a non-aqueous electrolyte secondary battery according to present embodiment will be described with reference to the drawings. Note that in the drawings, in order to make it easy to understand each configuration, some parts are emphasized or simplified, and actual structures, shapes, scales, and the like may be different from those of the drawings.

1. Metal Composite Hydroxide

FIG. 1 is a diagram illustrating an example of the metal composite hydroxide according to the present embodiment. As illustrated in FIG. 1, a metal composite hydroxide 10 contains first particles 11 having a core portion 11a inside the first particle 11 and a shell portion 11b formed around the core portion 11a. In other words, the first particles 11 have a core-shell structure.

The metal composite hydroxide 10 has a high nickel ratio and wide particle size distribution as to be described later, and thus a secondary battery fabricated using a positive electrode active material obtained using this as a precursor has significantly high battery capacity and energy density. Usually, a secondary battery fabricated using a positive electrode active material having a high nickel ratio and wide particle size distribution exhibits decreased thermal stability and weather resistance in some cases. However, the positive electrode active material obtained using the metal composite hydroxide 10 of the present embodiment as a precursor contains the first particles 11 having a core-shell structure and thus achieves a high battery capacity, high thermal stability, and weather resistance in a secondary battery at high levels.

The metal composite hydroxide 10 (including the first particles 11) is mainly formed of secondary particles with a plurality of aggregated primary particles (not illustrated). The metal composite hydroxide 10 may contain single primary particles in a small amount. In the present specification, the metal composite hydroxide 10 refers to the whole particles which constitute the metal composite hydroxide 10 including the plurality of first particles 11. The metal composite hydroxide 10 may contain particles other than the first particles 11 in a small amount. Hereinafter, the details of the metal composite hydroxide 10 will be described.

[Entire Metal Composite Hydroxide]
(Composition)

The composition of the (entire) metal composite hydroxide 10 is represented by a general formula (1): $Ni_{1-x-}$ $_yCo_xMn_yM_zO_{2+\alpha}$ (where $0.02 \leq x \leq 0.3$, $0.02 \leq y \leq 0.3$, $0 \leq z \leq 0.05$, and $-0.5 \leq \alpha \leq 0.5$ are satisfied and M is at least one element selected from the group consisting of Mg, Ca, Al, Si, Fe, Cr, V, Mo, W, Nb, Ti, and Zr).

In the general formula (1), the value of $(1-x-y)$ indicating the ratio of nickel is $0.35 < (1-x-y) \leq 0.96$, preferably $0.4 \leq (1-x-y) \leq 0.96$, preferably $0.55 \leq (1-x-y) \leq 0.96$, more preferably $0.6 \leq (1-x-y) \leq 0.95$, more preferably, $0.7 \leq (1-x-y) \leq 0.9$. When the ratio of nickel is in the above range, the secondary battery obtained using the metal composite hydroxide 10 as a precursor of the positive electrode active material can have a high battery capacity. In particular, when the nickel ratio is higher within the above range, the battery capacity (charge and discharge capacity) of the obtained secondary battery can be further improved. The value of $(1-x-y)$ may exceed 0.7. When the value of $(1-x-y)$ exceeds 0.96, the thermal stability of the positive electrode active material decreases.

In the general formula (1), the value of x indicating the ratio of cobalt is $0.02 \leq x \leq 0.3$, preferably $0.02 \times 0.2$, more preferably $0.03 < \times 0.2$, more preferably $0.05 \leq \times 0.1$. When the ratio of cobalt is within the above range, cobalt contributes to the improvement in charge and discharge cycle characteristics and output characteristics. On the other hand, when the value of x exceeds 0.3, the Ni ratio relatively decrease and this makes it difficult to achieve capacity enlargement of the secondary battery. Since cobalt is expensive, it is industrially desirable that the value of x is as low as possible within the above range from the viewpoint of cost.

In the general formula (1), the value of y indicating the ratio of manganese is $0.02 \leq y \leq 0.3$, preferably $0.05 \leq y \leq 0.25$, preferably $0.10 \leq y \leq 0.20$ or less, more preferably $0.10 \leq y \leq 0.15$. When the ratio of manganese is in the above range, manganese contributes to the improvement in thermal stability and weather resistance. When the value of y is less than 0.02, the thermal stability of a secondary battery fabricated using this positive electrode active material cannot be improved. On the other hand, when the value of y exceeds 0.3, the nickel ratio relatively decrease and this makes it difficult to achieve capacity enlargement of the secondary battery.

The metal composite hydroxide 10 may contain an element M. As such an element M, one or more selected from the group consisting of magnesium (Mg), calcium (Ca), aluminum (Al), silicon (Si), titanium (Ti), vanadium (V), chromium (Cr), zirconium (Zr), niobium (Nb), molybdenum (Mo), iron (Fe), and tungsten (W) can be used.

In the general formula (1), the value of z indicating the ratio of the element M is $0 \leq z \leq 0.05$, preferably $0.001 \leq z \leq 0.05$. When the ratio of the element M is in the above range, the durability and output characteristics of the secondary battery can be further improved. On the other hand, when the value of z exceeds 0.05, the number of metal elements which contribute to the redox reaction decreases and the battery capacity thus decreases.

When the element M is contained, the element M may be crystallized together with nickel, cobalt, and manganese in the crystallization process as to be described later and uniformly dispersed in the metal composite hydroxide 10 or may be covered on the surface of the metal composite hydroxide 10 after the crystallization process. Alternatively, the element M may be uniformly dispersed inside the particles and then covered on the surface of the particles. In any case, the content of the element M is controlled to be in the above range. The contents of nickel, cobalt, manganese, and element M can be measured by ICP atomic emission spectrophotometry.

(Particle Size Distribution of Metal Composite Hydroxide)

In the metal composite hydroxide 10, $[(D90-D10)/MV]$ that is calculated by D90 and D10 and the volume average particle diameter (MV) and indicates the dispersion of particle size in the particle size distribution by a laser diffraction scattering method is preferably 0.8 or more, more preferably 0.85 or more, still more preferably 0.9 or more. The particle size distribution of the positive electrode active material is strongly affected by the metal composite hydroxide 10 which is a precursor of the positive electrode active material. Hence, when $[(D90-D10)/MV]$ of the metal composite hydroxide 10 is in the above range, it is possible to widen the particle size distribution of the positive electrode active material obtained using the metal composite hydroxide 10 as a precursor, to improve the filling property of the positive electrode active material in the positive electrode, and to further improve the energy density of the secondary battery fabricated using this positive electrode active material.

When $[(D90-D10)/MV]$ of the metal composite hydroxide 10 is excessively large, fine particles and coarse particles are likely to exist and a secondary battery fabricated using such a positive electrode active material exhibit decreased cycle characteristics and thermal stability in some cases. Hence, the upper limit of $[(D90-D10)/MV]$ can be set to 1.3 or less from the viewpoint of battery performance. The particle size distribution can be set to be in the above range by appropriately adjusting the crystallization conditions in the crystallization process as to be described later.

D10 means the particle size at which the accumulated volume is 10% of the total volume of all particles when the number of particles in each particle size is accumulated from the smaller particle size side, and D90 means a particle size at which the accumulated volume is 90% of the total volume of all particles when the number of particles is accumulated from the smaller particle size side in the same manner. D10 and D90 can be determined from the volume integrated value measured using a laser light diffraction scattering particle size analyzer.

(Volume Average Particle Diameter MV)

The average particle size of the metal composite hydroxide 10 is preferably 5 μm or more and 20 μm or less, more preferably 7 μm or more and 20 μm or less, still more preferably 7 μm or more and 15 μm or less. The average particle size of the metal composite hydroxide 10 correlates with the average particle size of the positive electrode active material obtained using this metal composite hydroxide 10 as a precursor. Hence, when the average particle size of the metal composite hydroxide 10 is set to be in the above range, it is possible to control the average particle size of the obtained positive electrode active material to be in a predetermined range. The average particle size of the metal composite hydroxide 10 means the volume average particle diameter (MV) and can be determined, for example, from a volume integrated value measured using a laser light diffraction scattering particle size analyzer.

[First Particles]

The first particles 11 contained in the metal composite hydroxide 10 contain secondary particles with a plurality of aggregated primary particles. The first particles 11 has a core portion 11a having a high nickel ratio at the center of the secondary particle and a shell portion 11b which is formed around the core portion 11a and has a lower nickel ratio than the core portion 11a. The shape of the primary particles constituting the first particles 11 is not particularly limited and may be, for example, a plate shape or a needle shape.

In a secondary battery, the characteristics of the particle surface of the positive electrode active material which comes into contact with the air and the electrolyte solution greatly affect various battery characteristics. The first particles 11 have a composition in which the nickel ratio is lowered only in a specific range on the surface of the secondary particles and thus exhibit thermal stability and weather resistance. The first particles 11 as a whole have a high nickel ratio and thus have a high battery capacity. Hence, when the metal composite hydroxide 10 containing the first particles 11 is used as a precursor of the positive electrode active material, it is possible to obtain a secondary battery which exhibits thermal stability, weather resistance, and a high battery capacity.

(Composition of Core Portion)

The composition of the core portion 11a of the first particles 11 is represented by a general formula (2): $Ni_{1-x1-y1}Co_{x1}Mn_{y1}M_{z1}(OH)_{2+\alpha1}$ (where $0.4<(1-x_1-y_1)\leq0.96$, $0\leq z_1\leq0.05$, and $-0.5\leq\alpha_1\leq0.5$ are satisfied).

In the general formula (2), the range of $(1-x_1-y_1)$ indicating the ratio of nickel is $0.4<(1-x_1-y_1)\leq0.96$ and is preferably $0.55\leq(1-x_1-y_1)\leq0.96$, more preferably $0.6\leq(1-x_1-y_1)\leq0.96$, still more preferably $0.7\leq(1-x_1-y_1)\leq0.90$ from the viewpoint of high battery capacity.

In the general formula (2), the values of $x_1$ and $y_1$ indicating the ratios of cobalt and manganese are not particularly limited as long as the ratio of nickel satisfies the above range and are selected from the ranges of $0\leq x_1<0.6$ and $0\leq y_1<0.6$.

In the general formula (2), the range of $z_1$ indicating the ratio of the element M is $0\leq z_1\leq0.05$, preferably $0.001\leq z\leq0.05$. It may be $z_1=0$. The kind of element M is similar to that in the general formula (1). When the core portion 11a contains the element M, the battery characteristics can be improved.

The composition of the core portion 11a can be determined by, for example, quantitative analysis by energy dispersive X-ray analysis (EDX) in cross-sectional observation under a scanning transmission electron microscope (STEM). The composition of the core portion 11a can be adjusted to the above range by, for example, controlling the composition of the metal components in the first raw material aqueous solution in the first crystallization process (step S1, see FIG. 2) as to be described later.

(Structure of Core Portion)

In the first particles 11 having a particle size similar to the volume average particle diameter (MV) of the metal composite hydroxide 10, the core portion 11a can have a radius $R_{11a}$ to be 60% or more and 90% or less of the radius $R_{11}$ of the first particles 11 from the center of the first particles 11 and preferably has a radius $R_{11a}$ to be 70% or more and 90% or less, more preferably 80% or more and 90% or less of the radius $R_{11}$ of the first particles 11. When the radius $R_{11a}$ of the core portion 11a is in the above range, the positive electrode active material obtained using the metal composite hydroxide 10 as a precursor can have a high battery capacity. In the present specification, to have a particle size similar to the volume average particle diameter (MV) means to have a particle size in a range to be ±10% of the volume average particle diameter (MV).

(Composition of Shell Portion)

The composition of the shell portion 11b of the first particles 11 is represented by a general formula (3): $Ni_{1-x2-y2}Co_{x2}Mn_{y2}M_{z2}(OH)_{2+\alpha2}$. In the formula (3), $(1-x_1-y_1)/(1-x_2-y_2)>1.0$ is satisfied and $0<(1-x_2-y_2)<0.6$ and $0\leq z_2\leq0.05$ are satisfied.

In the general formula (3), the value of $(1-x_2-y_2)$ indicating the ratio of nickel at the shell portion 11b satisfies $(1-x_1-y_1)/(1-x_2-y_2)>1.0$ and is $0<(1-x_2-y_2)<0.6$. In other words, the nickel ratio at the shell portion 11b is lower than the nickel ratio at the core portion 11a, and the shell portion 11b contains nickel at less than 60 mol % of the total number of atoms (number of moles) of the metal elements excluding the element M. When the nickel ratio at the shell portion 11b is low, a positive electrode active material exhibiting excellent thermal stability and weather resistance can be obtained. It is more preferable as the ratio of nickel is higher within the above range from the viewpoint of high battery capacity.

In the general formula (3), the value of $x_2$ indicating the content of cobalt is not particularly limited as long as the above formula is satisfied but is, for example, $0\leq x_2<1.0$, preferably $0.05\leq x_2\leq0.6$, more preferably $0.05\leq x_2\leq0.5$. When the cobalt content ($x_2$) is in the above range, the secondary battery fabricated using the metal composite hydroxide 10 as a precursor of the positive electrode active material exhibits superior thermal stability and cycle characteristics. The value of $x_2$ may be $0.05\leq x_2\leq0.3$ from the viewpoint of further improving the thermal stability and weather resistance.

In the general formula (3), the value of $y_2$ indicating the content of manganese is not particularly limited as long as the above formula is satisfied but is, for example, $0\leq y_2<1.0$, preferably $0.05\leq y_2\leq0.6$, more preferably $0.05\leq y_2\leq0.5$. When the manganese content ($y_2$) is in the above range, the secondary battery obtained using the metal composite hydroxide 10 as a precursor of the positive electrode active material can exhibit high thermal stability and weather resistance. The value of $y_2$ may be $0.05\leq y_2\leq0.3$ from the viewpoint of further improving the thermal stability and cycle characteristics.

In the general formula (3), the range of $z_2$ indicating the ratio of the element M is $0\leq z_2\leq0.05$ and may be $z_2=0$. The kind of element M is similar to that in the general formula (1). When the shell portion 11b contains the element M, the battery characteristics can be improved.

Figure 6:
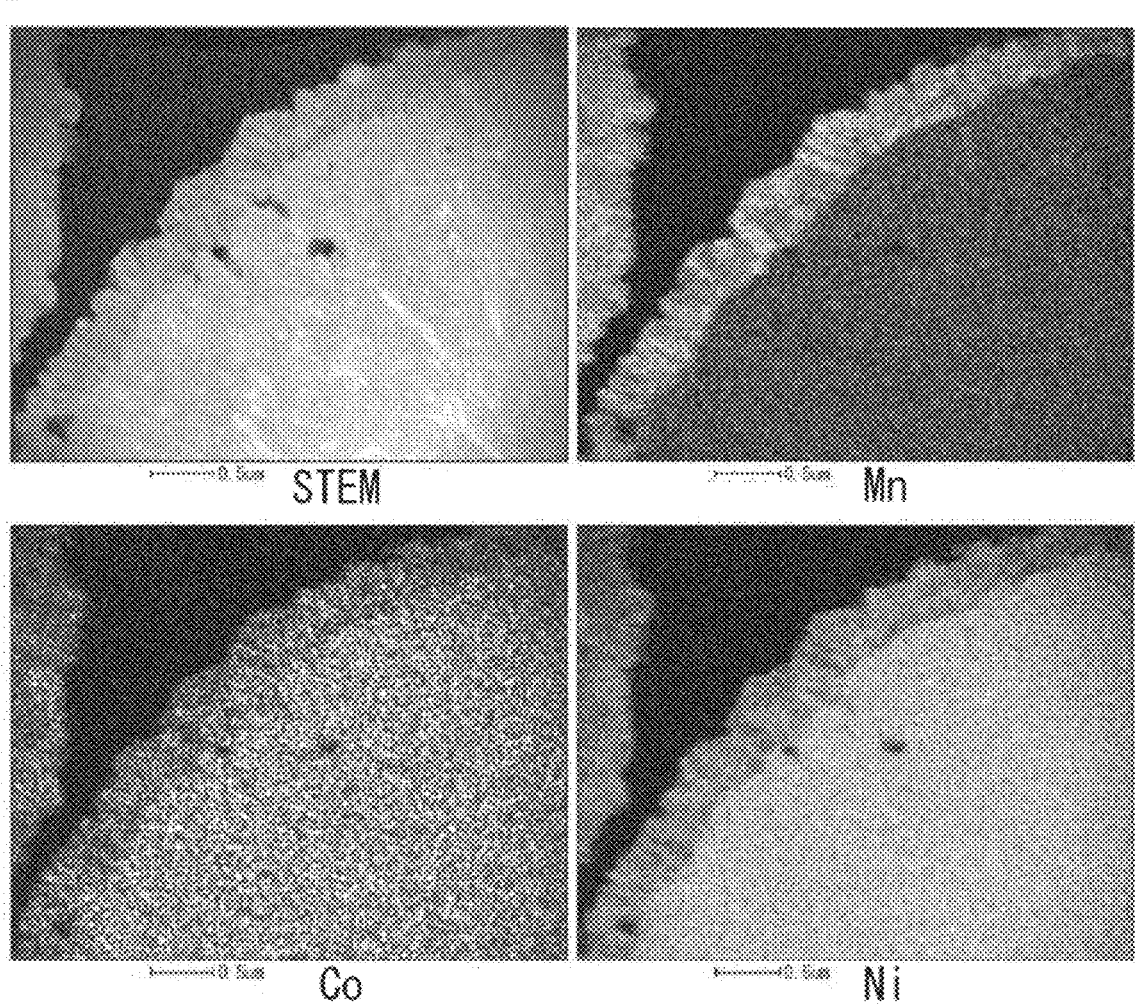
FIG. 6 is a drawing-substituting photograph illustrating distribution of respective metal elements in a cross section of a metal composite hydroxide obtained in Example 1 by surface analysis using STEM-EDX.
Figure 7:
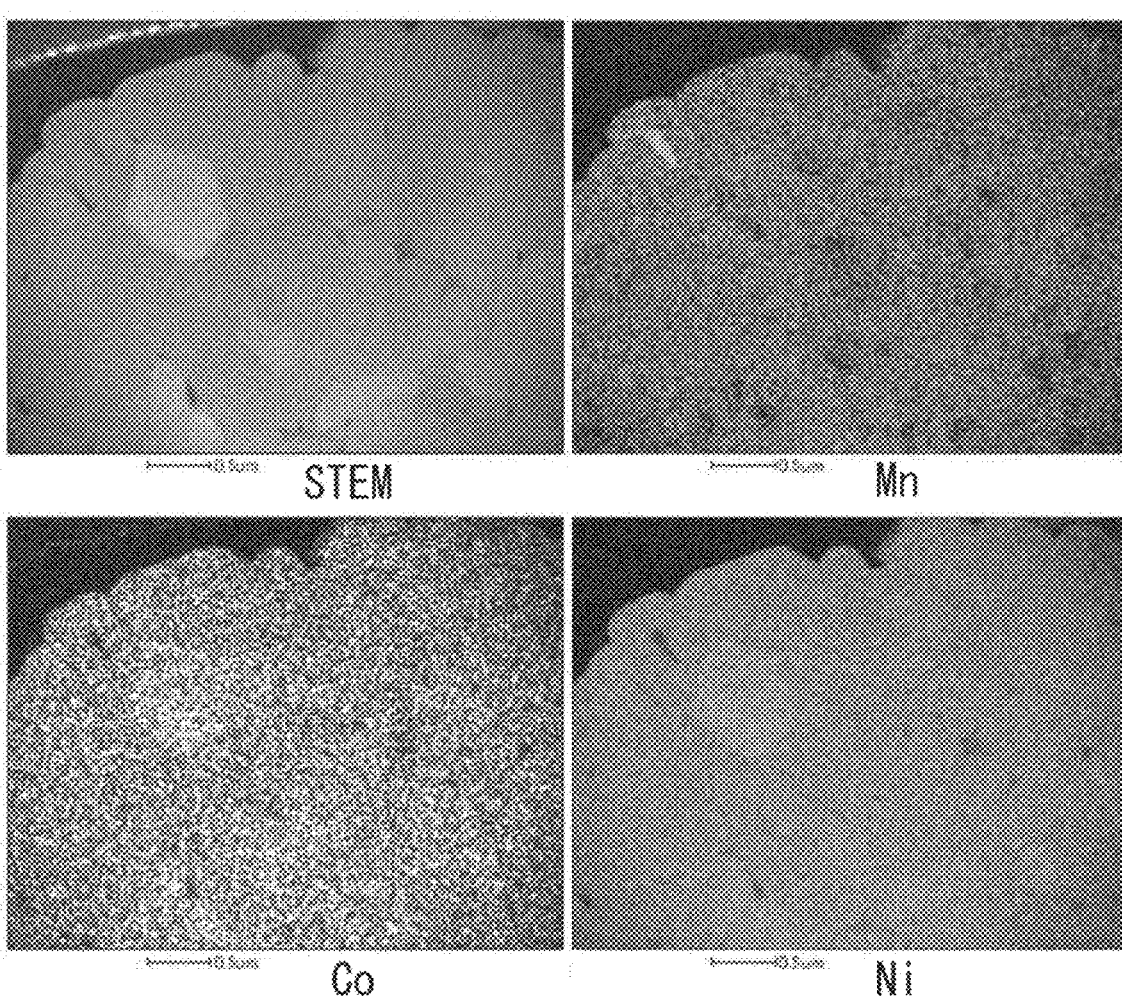
FIG. 7 is a drawing-substituting photograph illustrating distribution of respective metal elements in a cross section of a positive electrode active material obtained in Comparative Example 8 by surface analysis using STEM-EDX.

The composition of the shell portion 11b can be determined by, for example, quantitative analysis by energy dispersive X-ray analysis (EDX) in cross-sectional observation under a scanning transmission electron microscope (STEM). The shell portion 11b of the first particles 11 may have a composition gradient, for example, on the surface side of the first particles 11 and on the inner side in contact with the core portion 11a, but it is preferable that the composition is uniform throughout the shell portion 11b. Here, to have a uniform composition throughout the shell portion 11b means a state in which bias is not observed in the distribution of each metal element throughout the shell portion 11b, for example, when the cross section of the first particle 11 is analyzed by STEM-EDX as illustrated in FIG. 6. The composition of the shell portion 11b can be adjusted to the above range by, for example, controlling the composition of the metal components in the second raw material aqueous solution in the second crystallization process (step S2, see FIG. 2) as to be described later.

(Structure of Shell Portion)

In the first particles 11 having a particle size similar to the volume average particle diameter (MV) of the metal composite hydroxide 10 (namely, particle size in a range to be ±10% of MV), the thickness t of the shell portion 11b is 10% or more and 40% or less, preferably 10% or more and 30% or less, more preferably 10% or more and 20% or less of the radius $R_{11}$ of the first particles 11 in the direction from the surface to the center C of the particle. When the thickness t of the shell portion 11$b$ is in the above range, the secondary battery fabricated using the metal composite hydroxide 10 as a precursor of the positive electrode active material exhibits excellent thermal stability and weather resistance. When the upper limit of the thickness t of the shell portion 11$b$ is in the above range, the volume of the core portion 11$a$ having a high nickel ratio can be increased and the secondary battery fabricated using the positive electrode active material obtained using the metal composite hydroxide 10 as a precursor has a high battery capacity. The thickness t of the shell portion 11$b$ and the radius $R_{11}$ are values measured by observing the cross section of the metal composite hydroxide 10 under a scanning transmission electron microscope (STEM) or the like.

The thickness t of the shell portion 11$b$ can be set to, for example, 0.2 μm or more and 2.0 μm or less and is preferably more than 0.5 μm and 1.6 μm or less, more preferably 0.6 μm or more and 1.0 μm or less in the direction from the surface to the center C of the first particles 11. When the lower limit of the thickness of the shell portion 11$b$ is in the above range, a positive electrode active material exhibiting excellent thermal stability and weather resistance can be obtained.

2. Method for Producing Metal Composite Hydroxide

Figure 2:
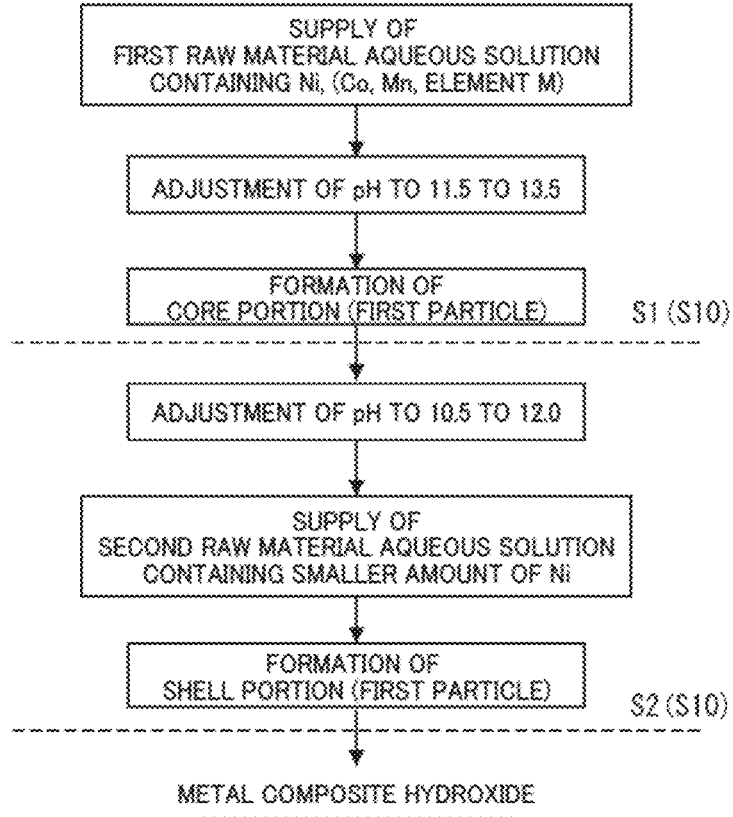
FIG. 2 is a diagram illustrating an example of a method for producing a metal composite hydroxide of the present embodiment.

FIG. 2 is a diagram illustrating an example of the method for producing a metal composite hydroxide according to the present embodiment. The production method according to the present embodiment includes a crystallization process (step S10) of producing a metal composite hydroxide containing first particles having a core-shell structure by a crystallization reaction. The obtained metal composite hydroxide is represented by a general formula (1): $Ni_{1-x-y}Co_xMn_yM_z(OH)_{2+\alpha}$ (where $0.02 \leq x \leq 0.3$, $0.02 \leq y \leq 0.3$, $0 \leq z \leq 0.05$, and $-0.5 \leq \alpha \leq 0.5$ are satisfied and M is at least one element selected from the group consisting of Mg, Ca, Al, Si, Fe, Cr, V, Mo, W, Nb, Ti, and Zr). By the production method according to the present embodiment, the metal composite hydroxide 10 described above can be easily produced on an industrial scale. The metal composite hydroxide 10 described above may be produced by a method other than the production method according to the present embodiment.

By the production method according to the present embodiment, the metal composite hydroxide 10 described above can be easily obtained by clearly separating the crystallization process (step S10) into two steps of a first crystallization process (step S1) of mainly forming the core portion of the first particles and a second crystallization process (step S2) of mainly forming the shell portion of the first particles and adjusting the crystallization conditions in each process as to be described below.

(1) Crystallization Process

The method for producing a metal composite hydroxide of the present embodiment includes a first crystallization process (step S1) of supplying a first raw material aqueous solution containing nickel and at least one of cobalt, manganese, or the element M into a reaction tank, adjusting the pH value of the reaction aqueous solution in the reaction tank to a specific range, and performing crystallization to form the core portion and a second crystallization process (step S2) of supplying a second raw material aqueous solution which has a lower nickel content than the first raw material aqueous solution and contains nickel, at least either of cobalt or manganese, and optionally the element M to the reaction aqueous solution that contains the core portion and has a pH value adjusted to a specific range and performing crystallization to form the shell portion as illustrated in FIG. 2.

As the crystallization method, it is preferable to use a continuous crystallization method in the first crystallization process (step S1). This makes it possible to obtain a positive electrode active material having a wide particle size distribution and high filling property. It is preferable to use a batch crystallization method in the second crystallization process (step S2). This makes it possible to form a shell structure having a composition with a low nickel ratio even in the first particles having a relatively small particle size and to obtain a positive electrode active material exhibiting improved thermal stability. Hereinafter, each process will be described.

[First Crystallization Process (Step S1)]

In the first crystallization process (step S1), a first raw material aqueous solution containing nickel and at least one of cobalt, manganese, or the element M is supplied into a reaction tank, the pH value of the reaction aqueous solution is adjusted to be in a range of pH 11.5 or more and 13.5 or less, and crystallization is performed to form the core portion. The composition of the core portion is represented by a general formula (2): $Ni_{1-x1-y1}Co_{x1}Mn_{y1}M_{z1}(OH)_{2+\alpha 1}$ (where $0.4 < (1-x_1-y_1) \leq 0.96$, $0 \leq z_1 \leq 0.05$, and $-0.5 \leq \alpha_1 \leq 0.5$ are satisfied). Hereinafter, a suitable example of the first crystallization process (step S1) will be described.

First, an alkaline aqueous solution is supplied into and mixed in the reaction tank to prepare a pre-reaction aqueous solution having a pH value of 11.5 or more and 13.5 or less as measured at a liquid temperature of 25° C. The ammonium ion concentration in the pre-reaction aqueous solution can be adjusted to, for example, 3 g/L or more and 25 g/L or less. The pH value of the pre-reaction aqueous solution can be measured using a pH meter.

Next, the first raw material aqueous solution is supplied while the pre-reaction aqueous solution is stirred. In this method, a reaction aqueous solution (reaction aqueous solution for core portion crystallization) in the first crystallization process is formed in the reaction tank. Since the pH value of this reaction aqueous solution is in the above range, nuclear generation and nuclear growth simultaneously occur in the reaction tank. In the first crystallization process, since the pH value of the reaction aqueous solution and the concentration of ammonium ions change as the particles are generated, an alkaline aqueous solution and an ammonia aqueous solution are properly supplied to control the pH value of the liquid in the reaction tank to be maintained in a range of pH 11.5 or more and 13.5 or less at a liquid temperature of 25° C.

In the first crystallization process, new nuclear generation and nuclear generation continuously proceed as, for example, the first raw material aqueous solution, an alkaline aqueous solution, and an aqueous solution containing an ammonium ion supplier are continuously supplied to the reaction aqueous solution. The first crystallization process is terminated when a predetermined amount of the first raw material aqueous solution is added.

The pH value of the reaction aqueous solution (reaction aqueous solution for core portion crystallization) in the first crystallization process is controlled to be in a range of 11.5 or more and 13.5 or less, preferably 12.0 or more and 13.0 or less at a liquid temperature of 25° C. When the pH is in the above range, excessive generation of nuclei can be suppressed and the particle size distribution of the particles (mainly the core portion of the first particles) generated in the first crystallization process can be stably widened. When the pH value is less than 11.5, the solubility of the metal ions increases, the rate of the crystallization reaction slows down, metal ions remain in the reaction aqueous solution, and the composition of the obtained metal composite hydroxide deviate from the intended value in some cases. When the pH value exceeds 13.5, nuclear generation preferentially occurs over the growth of nuclei (particles) and thus the particle size of the obtained metal composite hydroxide is small and is likely to be non-uniform. When the pH value exceeds 14.0, the produced nuclei may be too fine and there is thus a problem that the reaction aqueous solution gels in some cases. The fluctuation range of the pH value during the crystallization reaction is preferably controlled to be within ±0.2. When the fluctuation range of the pH value during the crystallization reaction is large, the amount of nuclei generated and the proportion of particle growth are not constant and it is difficult to obtain a metal composite hydroxide having stable particle size distribution.

[Second Crystallization Process (Step S2)]

In the second crystallization process (step S2), a second raw material aqueous solution having a lower nickel content than the first raw material aqueous solution is supplied to the reaction aqueous solution of which the pH value is adjusted in a range of 10.5 to 12.0 to obtain first particles having a shell portion formed around the core portion. The composition of the shell portion is represented by a general formula (3): $Ni_{1-x2-y2}CO_{x2}Mn_{y2}M_{z2}(OH)_{2+\alpha2}$ (where $(1-x_1-y_1)/(1-x_2-y_2)>1.0$, $0<(1-x_2-y_2)<0.6$, $0 \leq z_2 \leq 0.05$, and $-0.5 \leq \alpha_2 \leq 0.5$ are satisfied). Hereinafter, a suitable example of the second crystallization process (step S2) will be described.

After the first crystallization process (step S1), the pH value of the reaction aqueous solution containing the core portion in the reaction tank is first adjusted to 10.5 or more and 12.0 or less at a liquid temperature of 25° C., and a reaction aqueous solution (reaction aqueous solution for shell portion crystallization) in the second crystallization process is formed. The pH value of this reaction aqueous solution can be adjusted by stopping the supply of the alkaline aqueous solution, but it is preferable to temporarily stop supply of all the aqueous solutions and adjust the pH value in order to stably obtain a metal composite hydroxide which maintains the particle size distribution. Specifically, it is preferable to adjust the pH value by stopping supply of all the aqueous solutions and then supplying an inorganic acid of the same kind as the acid constituting the metal compound as a raw material to the reaction aqueous solution.

Next, supply of the second raw material aqueous solution is started while this reaction aqueous solution is stirred. At this time, the pH value of the reaction aqueous solution is in the above range, thus new nuclei are hardly generated, but the growth of nuclei (particles) proceeds, and a metal composite hydroxide is formed in which the particle size distribution width of the particles obtained in the first crystallization process is maintained. In the second crystallization process as well, the pH value and ammonium ion concentration in the aqueous solution for particle growth change as the particle growth proceeds, and thus the pH value and the ammonium ion concentration are maintained in the above ranges by properly supplying an alkaline aqueous solution and an ammonia aqueous solution.

The pH value of the reaction aqueous solution (reaction aqueous solution for shell portion crystallization) in the second crystallization process is controlled to be in a range of 10.5 or more and 12.0 or less, preferably 11.0 or more and 12.0 or less at a liquid temperature of 25° C. When the pH is in the above range, excessive generation of new nuclei can be suppressed and the particle size distribution of the whole particles generated in the second crystallization process (step S2) can be stably widened. Meanwhile, when the pH value is less than 10.5, the ammonium ion concentration increases and the solubility of metal ions increases, thus not only the rate of crystallization reaction slows down but also the amount of metal ions remaining in the reaction aqueous solution increases and the productivity decreases in some cases. When the pH value exceeds 12.0, the amount of nuclei generated during the particle growth process increases, the particle size of the metal composite hydroxide obtained is non-uniform, and the particle size distribution is likely to deviate from the suitable range. The fluctuation range of the pH value during the crystallization reaction is preferably controlled to be within ±0.2. When the fluctuation range of the pH value is large, the amount of nuclei generated and the proportion of particle growth are not constant and it is difficult to obtain a metal composite hydroxide having stable particle size distribution.

It is preferable to control the pH value of the reaction aqueous solution (reaction aqueous solution for shell portion crystallization) in the second crystallization process (step S2) so as to be a lower value than the pH value of the reaction aqueous solution (reaction aqueous solution for core portion crystallization) in the first crystallization process (step S1). From the viewpoint of clearly separating the nuclear generation from the particle growth and obtaining a metal composite hydroxide having stable particle size distribution, the pH value of the reaction aqueous solution in the second crystallization process (step S2) is set to be lower than the pH value of the reaction aqueous solution in the first crystallization process by preferably 0.5 or more, more preferably 0.9 or more.

When the pH value of the reaction aqueous solution in the first crystallization process (step S1) or second crystallization process (step S2) is in a range of 11.5 to 12.0, this pH range is the boundary condition for nuclear generation and nuclear growth and thus can be set to the condition in which either one of nuclear generation or nuclear growth preferentially occurs depending on the presence or absence of nuclei in the reaction aqueous solution. In other words, when the pH value in the first crystallization process is adjusted to be higher than 12.0, a large amount of nuclei are generated, and then the pH value in the second crystallization process is adjusted to 11.5 to 12.0, a large amount of nuclei are present in the reaction aqueous solution, thus particle growth preferentially occurs, and a metal composite hydroxide having relatively narrow particle size distribution can be obtained. On the other hand, when the pH value in the first crystallization process (step S1) is adjusted to 11.5 to 12.0, nuclei to grow are not present in the reaction aqueous solution, thus nuclear generation preferentially occurs, and the generated nuclei grow and a favorable metal composite hydroxide can be obtained by adjusting the pH value in the second crystallization process (step S2) to be lower than the pH value of the reaction aqueous solution in the first crystallization process.

As the time at which the process is switched from the first crystallization process (step S1) to the second crystallization process (step S2), the process can be switched to the second crystallization process (step S2) when the core portion 11a and shell portion 11b of the first particles 11 described above can be adjusted to have predetermined thicknesses, for example, after the raw material aqueous solution (including the first raw material aqueous solution and the second raw material aqueous solution) to be supplied in the entire crystallization process (step S10) is added by more than 60 mol % and less than 90 mol %, preferably 65 mol % or more and 80 mol % or less as the sum of metal salts in the raw material aqueous solution in the first crystallization process (step S1).

[Metal Composite Hydroxide]

The metal composite hydroxide obtained in the second crystallization process (step S2) contains first particles having a core portion inside the particles and a shell portion formed around the core portion. Here, the particle size of the (entire) metal composite hydroxide can be controlled by the amount of the raw material aqueous solution supplied, the crystallization time, the pH value of the reaction aqueous solution, and the like in the first crystallization process (step S1) and the second crystallization process (step S2). For example, by performing the first crystallization process (step S1) in a reaction aqueous solution having a high pH value, it is possible to increase the amount of nuclei generated and decrease the particle size of the obtained metal composite hydroxide. On the contrary, by suppressing the amount of nuclei generated in the first crystallization process (step S1), it is possible to increase the particle size of the obtained metal composite hydroxide. Hereinafter, suitable examples of conditions other than the above in the crystallization process according to the present embodiment will be described.

(Raw Material Aqueous Solution)

The first and second raw material aqueous solutions are each prepared by dissolving compounds containing transition metals (Ni, Co, Mn, and optionally M) which are raw materials in the first and second crystallization processes in water. In the crystallization process, the ratio of metal elements in the raw material aqueous solution is approximately the same as the composition ratio in the obtained metal composite hydroxide. For this reason, the content of each metal element in the raw material aqueous solution used can be appropriately adjusted according to the intended composition of metal composite hydroxide.

In the production method of the present embodiment, the ratio of metal elements in the (entire) raw material aqueous solution used for the crystallization reaction is almost identical with the composition ratio of the metals in the metal composite hydroxide represented by the general formula (1) and thus can be adjusted to $Ni:Mn:Co:M=(1-x-y):x:y:z$ ($0.02 \leq x \leq 0.3$, $0.02 \leq y \leq 0.3$, $0 \leq z \leq 0.05$).

The ratio of metal elements in the first raw material aqueous solution can be adjusted to, for example, $Ni:Co:Mn:M=(1-x_1-z_1):x_1:y_1:z_1$ (where $0.4<(1-x_1-y_1) \leq 0.96$ and $0 \leq z_1 \leq 0.05$ are satisfied). $(1-x_1-y_1)$ indicating the ratio of Ni in the first raw material aqueous solution is preferably $0.55 \leq (1-x_1-y_1) \leq 0.96$, more preferably $0.6 \leq (1-x_1-y_1) \leq 0.96$, still more preferably $0.7 \leq (1-x_1-y_1) \leq 0.90$ from the viewpoint of high battery capacity.

The ratio of metal elements in the second raw material aqueous solution can be adjusted to, for example, $Ni:Co:Mn:M=(1-x_2-z_2):x_2:y_2:z_2$ (where $(1-x_1-y_1)/(1-x_2-y_2) >1.0$, $0<(1-x_2-y_2)<0.6$). $(1-x_2-y_2)$ indicating the ratio of Ni in the second raw material aqueous solution preferably satisfies $0<(1-x_2-y_2)<0.5$. When the ratio of Ni is in the above range, excellent thermal stability and weather resistance are exhibited when a positive electrode active material obtained using the metal composite hydroxide thus obtained as a precursor is used in a secondary battery.

$x_2$ indicating the content of Co in the second raw material aqueous solution is, for example, $0 \leq x_2<1.0$, preferably $0.05 \leq x_2 \leq 0.6$, more preferably $0.05 \leq x_2 \leq 0.5$ from the viewpoint of further improving the output characteristics and cycle characteristics of the secondary battery. $y_2$ indicating the content of Mn is, for example, $0 \leq y_2<1.0$, preferably $0.05 \leq y_2 \leq 0.6$, more preferably $0.05 \leq y_2 \leq 0.5$ from the viewpoint of further improving the thermal stability and short circuit resistance of the secondary battery.

The compounds of transition metal elements (Ni, Co, Mn, and optionally M) used in the preparation of the first and second raw material aqueous solutions are not particularly limited, but it is preferable to use water-soluble nitrates, sulfates, and hydrochlorides from the viewpoint of ease of handling and it is particularly preferable to suitably use sulfates from the viewpoint of cost and of preventing mixing of halogen.

When at least either of the first or second raw material aqueous solution contains the element M (M is one or more additive elements selected from the group consisting Mg, Ca, Al, Ti, V, Cr, Zr, Nb, Mo, Hf, Fe, and W), as a compound containing M, a water-soluble compound is preferable, for example, magnesium sulfate, calcium sulfate, aluminum sulfate, titanium sulfate, ammonium peroxotitanate, potassium titanium oxalate, vanadium sulfate, ammonium vanadate, chromium sulfate, potassium chromate, zirconium sulfate, niobium oxalate, ammonium molybdate, hafnium sulfate, iron sulfate, sodium tungstate, ammonium tungstate and the like can be suitably used.

The concentration of each of the first and second raw material aqueous solutions is preferably 1 mol/L or more and 2.6 mol/L or less, more preferably 1.5 mol/L or more and 2.2 mol/L or less as the sum of metal compounds. When the concentrations of the first and second raw material aqueous solutions are less than 1 mol/L, the amount of crystallized substance per reaction tank decreases and thus the productivity decreases in some cases. On the other hand, when the concentrations of the first and second raw material aqueous solutions exceed 2.6 mol/L, the concentrations exceed the saturated concentrations at room temperature and it is thus concerned that crystals of each metal compound are redeposited to clog the pipe and the like.

As each of the first and second raw material aqueous solutions, one kind of raw material aqueous solution may be used or plural kinds of raw material aqueous solutions may be used. For example, in the case of performing the crystallization reaction using a metal compound which reacts when being mixed with a plurality of compounds to produce a compound other than the intended compound as a raw material in the first crystallization process, raw material aqueous solutions containing metal compounds may be separately prepared and the raw material aqueous solution containing each metal compound may be supplied to the reaction tank at a predetermined proportion so that the total concentration of the entire first raw material aqueous solution is in the above range.

The amount of the first raw material aqueous solution supplied is set so that the concentration of the product (mainly the core portion of the first particle) in the reaction aqueous solution is preferably 30 g/L or more and 200 g/L or less, more preferably 80 g/L or more and 150 g/L or less at the end point of the first crystallization process. When the concentration of the product is less than 30 g/L, the primary particles constituting the first particles are insufficiently aggregated in some cases. On the other hand, when the metal compound aqueous solutions are separately prepared and the concentration of the product exceeds 200 g/L, the metal salt aqueous solution for nuclear generation or the metal salt aqueous solution for particle growth does not sufficiently diffuse in the reaction tank and this causes biased particle growth in some cases.

In the second crystallization process, the pH value of the reaction aqueous solution is low, thus particle growth is likely to occur even when the concentration of the product in the shell crystallization aqueous solution is increased to be higher than that in the first crystallization process (core portion formation). The concentration of the product in the reaction aqueous solution for shell portion crystallization is controlled to be preferably 30 g/L or more and 1000 g/L or less, more preferably 80 g/L or more and 800 g/L or less, more preferably 80 g/L or more and 500 g/L or less at the end point of the second crystallization process. When the concentration of the product is less than 30 g/L, the primary particles are insufficiently aggregated in some cases. On the other hand, when the concentration of the product exceeds 500 g/L, the metal salt aqueous solution in the reaction aqueous solution does not sufficiently diffuse in the reaction tank and this causes biased particle growth in some cases.

(Alkaline Aqueous Solution)

The alkaline aqueous solution for adjusting the pH value in the reaction aqueous solution is not particularly limited, and general aqueous solutions of alkali metal hydroxides such as sodium hydroxide and potassium hydroxide can be used. The alkali metal hydroxide can be directly added to the reaction aqueous solution but is preferably added as an aqueous solution from the viewpoint of ease of pH control. In this case, the concentration of the aqueous solution of alkali metal hydroxide is preferably 20 mass % to 50 mass %, more preferably 20 mass % to 30 mass %. By regulating the concentration of the alkali metal aqueous solution to such a range, it is possible to prevent the pH value from locally increasing at the added location while suppressing the amount of solvent (water amount) supplied to the reaction system and thus to easily control the particle size distribution of the composite hydroxide particles.

The method for supplying the alkaline aqueous solution is not particularly limited as long as the pH value of the reaction aqueous solution does not locally increase and is maintained in a predetermined range. For example, the reaction aqueous solution may be supplied by a pump capable of controlling the flow rate such as a metering pump while being sufficiently stirred.

(Ammonium Ion Concentration)

The ammonium ion concentration in the reaction aqueous solution is maintained at a constant value within a range of preferably 3 g/L or more and 25 g/L or less, more preferably 5 g/L or more and 20 g/L or less. Ammonium ions function as a complexing agent in the reaction aqueous solution, and thus when the ammonium ion concentration is less than 3 g/L, the solubility of metal ions cannot be maintained constant, the reaction aqueous solution is likely to gel, and it is difficult to obtain composite hydroxide particles having well-regulated shape and particle size. On the other hand, when the ammonium ion concentration exceeds 25 g/L, the solubility of metal ions increases too high, thus the amount of metal ions remaining in the reaction aqueous solution increases, and this causes deviation of composition and the like.

When the ammonium ion concentration fluctuates during the crystallization reaction, the solubility of metal ions fluctuates and metal composite hydroxide particles having stable particle size distribution are not formed. For this reason, it is preferable to control the fluctuation range of ammonium ion concentration in a certain range throughout the first crystallization process (core portion formation) and the second crystallization process (shell portion formation). Specifically, the fluctuation range is preferably controlled to a fluctuation range of ±5 g/L.

The aqueous solution containing an ammonium ion supplier is not also particularly limited and, for example, ammonia water or an aqueous solution of ammonium sulfate, ammonium chloride, ammonium carbonate, or ammonium fluoride can be used. When using ammonia water as the ammonium ion supplier, the concentration thereof is set to preferably 20 mass % to 30 mass % or less, more preferably 22 mass % to 28 mass % or less. When the concentration of ammonia water is in the above range, it is possible to suppress loss of ammonia due to volatilization and the like to the minimum and thus to improve the production efficiency. As the method for supplying the aqueous solution containing an ammonium ion supplier as well, the aqueous solution can be supplied by a pump capable of controlling the flow rate in the same manner as the alkaline aqueous solution.

(Reaction Temperature)

The temperature (reaction temperature) of the reaction aqueous solution is controlled to be in a range of preferably 20° C. or more, more preferably 20° C. or more and 60° C. or less throughout the first and second crystallization processes. When the reaction temperature is less than 20° C., the solubility of reaction aqueous solution decreases, thus nuclear generation is likely to occur, and it is difficult to control the average particle size and particle size distribution of the composite hydroxide particles obtained. The upper limit of the reaction temperature is not particularly limited, but volatilization of ammonia is promoted when the reaction temperature exceeds 60° C., the amount of the aqueous solution which contains an ammonium ion supplier and is supplied in order to control the ammonium ions in the reaction aqueous solution in a certain range increases, and the production cost increases.

(Reaction Atmosphere)

The reaction atmosphere in the first and second crystallization processes is not particularly limited but is preferably controlled to a non-oxidizing atmosphere. Specifically, the reaction atmosphere can be controlled to a mixed atmosphere of oxygen and inert gas so that the oxygen concentration in the reaction atmosphere is, for example, 5 vol % or less, preferably 2 vol % or less. This makes it possible to grow the nuclei generated in the first crystallization process (step S1) to a certain range while suppressing unnecessary oxidation.

(Coating Process)

In the method for producing a metal composite hydroxide of the present embodiment, a compound containing the element M may be optionally added to the raw material aqueous solution. When the raw material aqueous solution contains the element M, it is possible to obtain a metal composite hydroxide in which the element M is uniformly dispersed inside the particles. In addition, a coating process of coating the surface of the metal composite hydroxide with a compound containing the element M may be performed after the second crystallization process. When the element M is covered, the effect by the addition of element M can be attained in a smaller amount added.

The coating method is not particularly limited as long as the metal composite hydroxide can be coated with a compound containing the element M. Composite hydroxide particles coated with a compound containing the element M may be obtained by, for example, slurrying the metal composite hydroxide, and controlling the pH value of the slurry to be in a predetermined range, adding an aqueous solution (aqueous solution for coating) in which a compound containing the element M is dissolved, and depositing the compound containing the element M on the surface of the metal composite hydroxide. In this case, an alkoxide solution of the element M may be added to the slurried metal composite hydroxide instead of the aqueous solution for coating. Instead of slurrying the metal composite hydroxide, an aqueous solution or slurry in which a compound containing the element M is dissolved may be sprayed and dried for coating. Coating can also be performed by a method in which a slurry suspended by the metal composite hydroxide and a compound containing the element M is sprayed and dried or a method in which the metal composite hydroxide and a compound containing the element M are mixed by a solid phase method.

When the surface of the metal composite hydroxide is coated with the element M, the compositions of the raw material aqueous solution and the aqueous solution for coating can be appropriately adjusted so that the composition of the metal composite hydroxide after coating is identical with the composition of the intended metal composite hydroxide. The heat treatment particles obtained after heat treatment of the metal composite hydroxide may be subjected to the coating process. When performing coating with the element M, the thickness of the coating layer can be appropriately adjusted as long as the effects of the present invention are not impaired.

(Production Apparatus)

In the first crystallization process (step S1) according to the present embodiment, it is preferable to use a continuous crystallize apparatus that collects the deposited (crystallized) product by an overflow method. When a continuous crystallization apparatus is used, the grown particles are collected at the same time as the overflowing liquid before being excessively grown and thus composite hydroxide particles having stable and wide particle size distribution can be easily obtained.

On the other hand, in the second crystallization process (step S2), it is preferable to use a batch type crystallization apparatus that does not collect the deposited product until the crystallization reaction is terminated. In the case of such a crystallization apparatus, the growing particles are not collected at the same time as the overflowing liquid unlike a continuous crystallization apparatus in which the product is collected by an overflow method, and thus the particle (core portion) surface can be coated with the shell portion while maintaining the particle size distribution of the metal composite hydroxide obtained in the first crystallization process (core portion formation).

3. Positive Electrode Active Material for Non-Aqueous Electrolyte Secondary Battery The positive electrode active material for non-aqueous electrolyte secondary battery according to the present embodiment (hereinafter, also referred to as "positive electrode active material") contains a lithium-metal composite oxide represented by a general formula (4): $Li_{1+a}Ni_{1-x-y}CO_xMn_yM_zO_{2+\beta}$ (where $-0.05 \le a \le 0.50$, $0.02 \le x \le 0.3$, $0.02 \le y \le 0.3$, $0 \le z \le 0.05$, and $-0.5 \le \beta \le 0.5$ are satisfied and M is at least one element selected from the group consisting of Mg, Ca, Al, Si, Fe, Cr, V, Mo, W, Nb, Ti, and Zr).

The positive electrode active material of the present embodiment can be produced using the metal composite hydroxide 10 as a precursor as to be described later. The lithium-metal composite oxide contains second particles having a core portion inside the particle and a shell portion formed around the core portion. The second particles can be obtained using the above-described first particles 11 as a precursor. The positive electrode active material of the present embodiment contains the second particles having a core-shell structure and thus achieves a high battery capacity, high thermal stability, and weather resistance at high levels when being used as a positive electrode of a secondary battery.

The positive electrode active material contains secondary particles with a plurality of aggregated primary particles. The positive electrode active material may contain a small amount of single primary particles and particles of other lithium-metal composite oxides as long as the effects of the present invention are not impaired. In the present specification, the positive electrode active material refers to the whole particles constituting the positive electrode active material, including the lithium-metal composite oxide (including the second particles) and other particles. Hereinafter, details of the positive electrode active material will be described.

[Composition of Lithium-Metal Composite Oxide]

The (overall) composition of the lithium-metal composite oxide according to the present embodiment is represented by a general formula (4): $Li_{1+a}Ni_{1-x-y}CO_xMn_yM_zO_{2+\beta}$ (where $-0.05 \le a \le 0.50$, $0.02 \le x \le 0.3$, $0.02 \le y \le 0.3$, $0 \le z \le 0.05$, and $-0.5 \le \beta \le 0.5$ are satisfied and M is at least one element selected from the group consisting of Mg, Ca, Al, Si, Fe, Cr, V, Mo, W, Nb, Ti, and Zr).

In the general formula (4), the value of a indicating the excess amount of lithium (Li) satisfies $-0.05 \le a \le 0.50$, preferably $0 \le a \le 0.20$, more preferably $0 \le a \le 0.10$. When the excess amount of lithium is in the above range, the output characteristics and battery capacity of the secondary battery fabricated using the positive electrode active material as a positive electrode material can be improved. In contrast, when the value of a is less than −0.05, the positive electrode resistance of the secondary battery increases and thus the output characteristics cannot be improved. On the other hand, when the value of a exceeds 0.50, not only the initial charge and discharge capacity decreases but also the positive electrode resistance increases in some cases. The value of a may be $0 \le a < 0.15$ or $0 \le a < 1.03$.

In the lithium-metal composite oxide represented by the general formula (4), the composition range of nickel, manganese, cobalt, and the element M constituting this and the preferable range thereof can be set to be similar to those in the metal composite hydroxide 10 represented by the general formula (1). Hence, description of these items will be omitted here. The contents of lithium, nickel, cobalt, manganese, and element M can be measured by ICP atomic emission spectrophotometry.

[Particle Size Distribution of Positive Electrode Active Material]

In the positive electrode active material, [(D90−D10)/MV] that indicates a dispersion of a particle size in particle size distribution calculated by D90, D10 and the volume average particle diameter (MV) by a laser diffraction scattering method is preferably 0.80 or more, more preferably 0.85 or more, still more preferably 0.90 or more. When [(D90−D10)/MV] of the positive electrode active material is in the above range, it is possible to widen the particle size distribution of the positive electrode active material, to improve the filling property of the positive electrode active material in the positive electrode, and to further improve the energy density of the secondary battery fabricated using this positive electrode active material.

When [(D90−D10)/MV] of the positive electrode active material is excessively large, fine particles and coarse particles are likely to exist and a secondary battery fabricated using such a positive electrode active material exhibit decreased cycle characteristics and thermal stability in some cases. Hence, the upper limit of [(D90−D10)/MV] can be set to 1.3 or less from the viewpoint of battery performance. The particle size distribution of the positive electrode active material can be adjusted to the above range by, for example, adjusting the particle size distribution of the metal composite hydroxide used as a precursor thereof to the above range. The meanings of D10 and D90 in the index [(D90–D10)/ MV] indicating the spread of particle size distribution and the method for determining these are similar to those in the metal composite hydroxide 10 described above, and thus the description thereof will be omitted here.

[Average Particle Size of Positive Electrode Active Material]

The average particle size of the positive electrode active material is preferably 5 μm or more and 20 μm or less, more preferably 7 μm or more and 20 μm or less, still more preferably 7 μm or more and 15 μm or less. When the average particle size of the positive electrode active material is in the above range, not only the battery capacity per unit volume of the secondary battery fabricated using this positive electrode active material can be increased but also the thermal stability and output characteristics can be improved. In contrast, when the average particle size is less than 5 μm, the filling property of the positive electrode active material decreases and it is difficult to increase the battery capacity per unit volume. On the other hand, when the average particle size exceeds 20 μm, the reaction area of the positive electrode active material decreases, the interface between the positive electrode active material and the electrolyte solution in the secondary battery decreases, and it is thus difficult to improve the output characteristics. The average particle size of the positive electrode active material means the volume average particle diameter (MV) and can be determined, for example, from a volume integrated value measured using a laser light diffraction scattering particle size analyzer.

(Composition of Core Portion)

The composition of the core portion of the lithium-metal composite oxide (second particles) is represented by a general formula (5): $Li_{1+a1}Ni_{1-x1-y1}Co_{x1}Mn_{y1}M_{z1}O_{2+\beta1}$ (where $-0.05 \leq a_1 \leq 0.50$, $0.4 < (1-x_1-y_1) \leq 0.96$, $0 \leq z_1 \leq 0.05$, and $-0.5 \leq \beta_1 \leq 0.5$ are satisfied).

In the general formula (5), the range of a indicating the excess amount of Li may be similar to that in the general formula (4). In the general formula (5), the values of $(1-x_1-y_1)$, $x_1$, $y_1$, and $z_1$ indicating the respective ratios of Ni, Co, Mn, and the element M are similar to those at the core portion 11a of the metal composite hydroxide 10 represented by the general formula (2).

The composition of the core portion of the lithium-metal composite oxide (second particles) can be determined by, for example, quantitative analysis by energy dispersive X-ray analysis (EDX) in the cross-sectional observation under a scanning transmission electron microscope (STEM). The composition of the metal elements other than lithium at the core portion of the second particles can be adjusted to the above range, for example, by setting the composition of the core portion of the metal composite hydroxide 10 used as a precursor to the range in the general formula (2), and the composition of lithium at the core portion of the second particles can be adjusted to the above range by setting the mixing proportion of the precursor and the lithium compound to the range to be described later.

(Structure of Core Portion)

In the second particles having a particle size similar to the volume average particle diameter MV of the positive electrode active material (namely, particle size in a range to be ±10% of MV), the core portion can have a radius to be 60% or more and 90% or less of the radius of the second particles from the center of the second particles and has a radius to be preferably 60% or more and 90% or less, preferably 70% or more and 90% or less, more preferably 80% or more and 90% or less of the radius of the second particles. When the radius of the core portion is in the above range, the positive electrode active material can have a high battery capacity.

(Composition of Shell Portion)

The composition of the shell portion of the lithium-metal composite oxide (second particles) is represented by a general formula (6): $Li_{1+a2}Ni_{1-x2-y2}CO_{x2}Mn_{y2}M_{z2}O_{2+\beta2}$ (where $-0.05 \leq a_2 \leq 0.50$, $(1-x_2-y_2)/(1-x_2-y_2) > 1.0$, $0 < (1-x_2-y_2) < 0.6$, $0 \leq z_2 \leq 0.05$, $-0.5 \leq \beta_2 \leq 0.5$ are satisfied).

In the general formula (6), the range of a indicating the excess amount of Li may be similar to that in the general formula (4). In the general formula (6), the values of $(1-x_2-y_2)$, $x_2$, $y_2$, and $z_2$ indicating the respective ratios of Ni, Co, Mn, and the element M are similar to those at the shell portion 11b of the metal composite hydroxide 10 represented by the general formula (3).

The composition of the shell portion of the lithium-metal composite oxide (second particles) can be determined by, for example, quantitative analysis by energy dispersive X-ray analysis (EDX) in the cross-sectional observation under a scanning transmission electron microscope (STEM). The composition of the metal elements other than lithium at the shell portion of the second particles can be adjusted to the above range, for example, by setting the composition of the shell portion of the metal composite hydroxide 10 used as a precursor to the range in the general formula (2), and the composition of lithium at the shell portion of the second particles can be adjusted to the above range by setting the mixing proportion of the precursor and the lithium compound to the range to be described later.

(Structure of Shell Portion)

In the second particles having a particle size similar to the volume average particle diameter (MV) of the positive electrode active material (namely, particle size in a range to be ±10% of MV), the thickness of the shell portion is 10% or more and 40% or less, preferably 10% or more and 30% or less, more preferably 10% or more and 20% or less of the radius of the second particles in the direction from the surface to the center of the particle. When the thickness of the shell portion is in the above range, a secondary battery used as the positive electrode active material exhibits excellent thermal stability and weather resistance. The thickness of the shell portion and the radius are values measured by observing the cross section of the lithium-metal composite oxide under a scanning transmission electron microscope (STEM) or the like in the same manner as in the metal composite hydroxide 10 described above.

The thickness of the shell portion can be set to, for example, 0.2 μm or more and 1.6 μm or less and is preferably 0.5 μm or more and 1.5 μm or less, more preferably 0.6 μm or more and 1.0 μm or less in the direction from the surface to the center of the second particle. When the lower limit of the thickness of the shell portion is in the above range, a positive electrode active material exhibiting excellent thermal stability and weather resistance can be obtained. When the upper limit of the thickness of the shell portion is in the above range, the volume of the core portion having a high nickel ratio can be increased and the secondary battery fabricated using the positive electrode active material has a high battery capacity.

[Specific Surface Area of Positive Electrode Active Material]

The specific surface area of the positive electrode active material is preferably 0.1 m²/g or more and 3 m²/g or less, more preferably 0.5 m²/g or more and 2.5 m²/g or less, still more preferably 0.9 m²/g or more and 2 m²/g or less. When the specific surface area is in the above range, the contact area between the positive electrode active material and the electrolyte solution is large in the positive electrode of the secondary battery and the output characteristics of the secondary battery can be improved. On the other hand, when the specific surface area of the positive electrode active material is less than 0.1 m²/g, the reaction area between the positive electrode active material and the electrolyte solution cannot be sufficiently secured in the positive electrode of the secondary battery and it is difficult to improve the output characteristics in some cases. When the specific surface area is too large, the reactivity between the positive electrode active material and the electrolyte solution is too high in the positive electrode of the secondary battery and the thermal stability decreases in some cases. The specific surface area of the positive electrode active material can be measured, for example, by a BET method using nitrogen gas adsorption.

[Tap Density of Positive Electrode Active Material]

In recent years, capacity enlargement of secondary batteries has become an important issue in order to extend the usage time of portable electronic devices and the mileage of electric cars. The thickness of the electrode of the secondary battery is required to be about several microns because of problems with packing of the entire battery and problems with electron conductivity. For this reason, it is important not only to increase the capacity per mass of the positive electrode active material but also to increase the capacity per volume of the entire secondary battery by improving the filling property of the positive electrode active material in order to improve the capacity of the secondary battery and decrease the electrode thickness. Here, the tap density is an index of the filling property of the positive electrode active material in the positive electrode.

The tap density of the positive electrode active material is preferably 2.0 g/cm³ or more, more preferably 2.2 g/cm³ or more, more preferably 2.3 g/cm³ or more. When the tap density of the positive electrode active material is less than 2.0 g/cm³, the filling property is low and the battery capacity of the entire secondary battery cannot be sufficiently improved in some cases. The upper limit of the tap density is not particularly limited but is, for example, about 3.0 g/cm³ or less. The tap density represents the bulk density of a sample powder which is sampled in a container and then tapped 100 times based on JIS Z-2504 and can be measured using a shaking specific gravity measuring instrument.

The method for producing the positive electrode active material is not particularly limited as long as it is possible to synthesize the positive electrode active material having the predetermined structure, average particle size, and particle size distribution described above using the metal composite hydroxide described above as a precursor. However, the positive electrode active material can be easily obtained on an industrial scale when the method for producing a positive electrode active material for non-aqueous electrolyte secondary battery of the present embodiment to be described later is used.

[Battery Characteristics of Positive Electrode Active Material]

Figure 5:
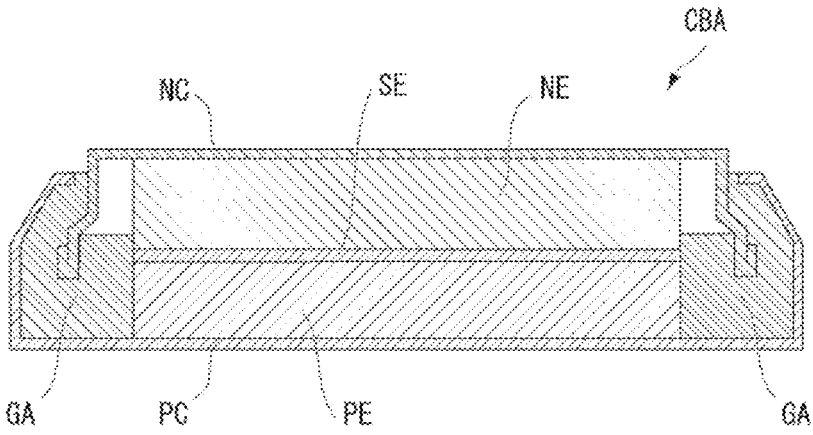
FIG. 5 is a schematic cross sectional view of a 2032 type coin-type battery used for battery evaluation.

For example, when a 2032 type coin-type battery CBA as illustrated in FIG. 5 is fabricated using the positive electrode active material according to the present embodiment and the initial charge capacity thereof is measured by the method described in Examples, the initial charge capacity can be set to, for example, 180 mAh/g or more, preferably 190 mAh/g or more, more preferably 200 mAh/g or more. The initial discharge capacity can be set to, for example, 180 mAh/g or more, preferably 190 mAh/g or more.

The positive electrode active material according to the present embodiment has a relatively high nickel ratio but the amount of oxygen released to be measured by the method described in Examples to be described later can be set to, for example, 12 mass % or less, preferably 10 mass % or less, more preferably 8 mass % or less. The lower limit of the amount of oxygen released is not particularly limited but is, for example, 1 mass % or more. The water content in the positive electrode active material according to the present embodiment after 24 hours of exposure to be measured by the method described in Examples to be described later can be set to, for example, 0.3 mass % or less, preferably 0.2 mass % or less, more preferably 0.15 mass % or less. The water content after 24 hours of exposure is not particularly limited but is, for example, 0.01 mass % or more.

Figure 3:
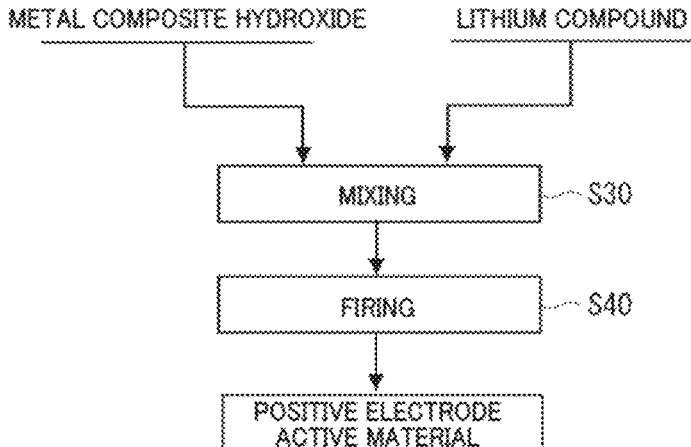
FIG. 3 is a diagram illustrating an example of a method for producing a positive electrode active material of the present embodiment.

4. Method for Producing Positive Electrode Active Material for Non-Aqueous Electrolyte Secondary Battery FIG. 3 is a diagram illustrating an example of the method for producing a positive electrode active material for non-aqueous electrolyte secondary battery according to the present embodiment (hereinafter, also referred to as "method for producing a positive electrode active material"). As illustrated in FIG. 3, the method for producing a positive electrode active material includes a mixing process (step S30) of mixing the metal composite hydroxide described above with a lithium compound to form a lithium mixture and a firing process (step S40) of firing the lithium mixture in an oxidizing atmosphere at 650 or more and 900° C. or less.

Figure 4:
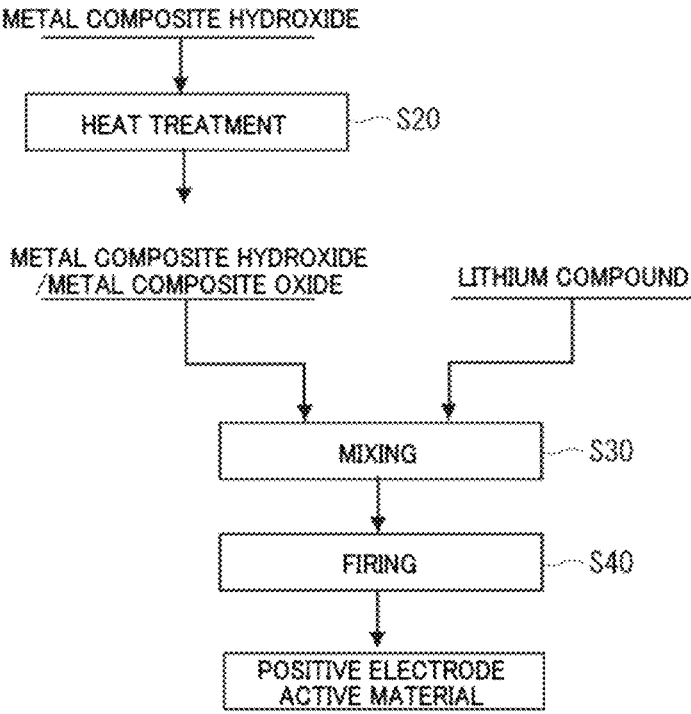
FIG. 4 is a diagram illustrating an example of a method for producing a positive electrode active material of the present embodiment.

By the production method according to the present embodiment, the positive electrode active material described above can be easily produced on an industrial scale. In the production method according to the present embodiment, other processes such as a heat treatment process (step S20) and a calcination process as illustrated in FIG. 4 may be added if necessary. In the present specification, the "metal composite hydroxide" which is mixed with a lithium compound without being subjected to a heat treatment and the "metal composite hydroxide and/or metal composite oxide" which are mixed with a lithium compound after the heat treatment process (step S20) are collectively referred to as "precursor". Hereinafter, the respective processes will be described.

(1) Mixing Process (Step S30)

As illustrated in FIGS. 3 and 4, the mixing process (step S30) is a process of mixing a metal composite hydroxide or at least either (precursor) of a metal composite hydroxide or a metal composite oxide obtained by subjecting this metal composite hydroxide to a heat treatment with a lithium compound to obtain a lithium mixture. In the mixing process (step S30), a compound containing the element M may be mixed with the lithium compound together with the precursor.

The mixing proportion of the precursor and the lithium compound is adjusted so that the ratio (Li/Me) of the sum (Me) of the metal atoms other than lithium to the number of atoms of lithium (Li) in the lithium mixture is 0.95 or more and 1.5 or less, preferably 1.0 or more and 1.2 or less, more preferably 1.0 or more and 1.1 or less. The sum (Me) of metal atoms other than lithium specifically means the sum of the numbers of atoms of nickel, cobalt, manganese, and the element M. In other words, Li/Me does not change after the firing process (step S40), and thus the precursor and the lithium compound are required to be mixed so that Li/Me in the mixing process (step S30) is Li/Me of the intended positive electrode active material.

The lithium compound used in the mixing process (Step S30) is not particularly limited, but it is preferable to use lithium hydroxide, lithium nitrate, lithium carbonate, or any mixture thereof from the viewpoint of easy procurement. In particular, it is preferable to use lithium hydroxide or lithium carbonate in consideration of ease of handling and quality stability.

It is preferable to sufficiently mix the precursor and the lithium compound to an extent to which fine powders are not generated. When the mixing is insufficient, Li/Me varies among individual particles of the obtained positive electrode active material and sufficient battery characteristics cannot be attained in some cases. A general mixer can be used for mixing. For example, a shaker mixer, a Lodige mixer, a Julia mixer, and a V blender can be used as the mixer.

[Heat Treatment Process (Step S20)]

In the method for producing a positive electrode active material of the present embodiment, a heat treatment process (step S20, see FIG. 4) of subjecting the metal composite hydroxide to a heat treatment may be optionally provided before the mixing process (step S30). The heat treatment process (step S20) is a process of heating the metal composite hydroxide to remove at least a part of excess moisture contained in the metal composite hydroxide. When the heat treatment is included before the mixing process (step S30), it is possible to decrease the moisture remaining until the firing process (step S40) is terminated to a certain amount and to decrease variation in the composition of the positive electrode active material obtained.

By the heat treatment process (step S20), at least either of a metal composite hydroxide or a metal composite oxide obtained by subjecting the metal composite hydroxide to a heat treatment is obtained. In other words, as the particles obtained, a metal composite hydroxide from which at least a part of excess moisture has been removed, a metal composite oxide obtained by conversion of the metal composite hydroxide into an oxide, or a mixture thereof is included.

The temperature for the heat treatment can be set to, for example, 105° C. or more and 750° C. or less and may be set to 105° C. or more and 200° C. or less. When the temperature for the heat treatment is less than 105° C., excess moisture in the metal composite hydroxide cannot be sufficiently removed and variation cannot be sufficiently suppressed in some cases. On the other hand, when the heating temperature exceeds 750° C., not only a further effect cannot be expected but also the production cost increases.

In the heat treatment process (step S20), it is only required to remove moisture to an extent to which the proportions of the number of atoms of lithium and metal components other than lithium in the positive electrode active material do not vary, and thus it is not required to convert all the metal composite hydroxides to metal composite oxides. However, it is preferable to convert all the metal composite hydroxides to metal composite oxides by performing heating at 400° C. or more from the viewpoint of decreasing variations in the proportions of the number of atoms of lithium and metal components other than lithium in the positive electrode active material. The above-described variations can be further suppressed by determining the metal components contained in the metal composite hydroxide/metal composite oxide after the heat treatment in advance by analysis and determining the mixing ratio thereof to the lithium compound.

The atmosphere in which the heat treatment is performed is not particularly limited and may be a non-reducing atmosphere, but the heat treatment is preferably performed in an air flow in which the heat treatment can be simply performed. The heat treatment time is not particularly limited but is set to preferably 1 hour or more, more preferably 5 hours or more and 15 hours or less from the viewpoint of sufficiently removing excess moisture in the metal composite hydroxide.

[Firing Process (Step S40)]

As illustrated in FIGS. 3 and 4, the firing process (step S40) is a process of firing the lithium mixture at 650° C. or more and 900° C. or less and diffusing lithium in the precursor to obtain a lithium-metal composite oxide.

During the firing process (step S40), homogenization of the gradient of the composition forming the core-shell structure inside the precursor particles proceeds by the diffusion of elements due to heat. The homogenization of the composition is more remarkable as the temperature at the time of firing is higher or the firing time is longer. Hence, when proper firing conditions are not selected, the lithium-metal composite oxide obtained after firing cannot maintain the core-shell structure in the precursor and has a uniform composition throughout secondary particle in some cases. For this reason, the lithium-metal composite oxide having the core-shell structure can be obtained by appropriately adjusting the firing conditions in a specific range. Hereinafter, an example of a preferable range of firing conditions will be described.

(Firing Temperature)

The firing temperature of the lithium mixture is 650° C. or more and 900° C. or less, preferably 650° C. or more and 850° C. or less. When the firing temperature is less than 650° C., lithium does not sufficiently diffuse inside the precursor particles, and excess lithium and the unreacted precursor remain or the crystallinity of the lithium-metal composite oxide obtained is insufficient in some cases. On the other hand, when the firing temperature exceeds 950° C., the particles of lithium-metal composite oxide are severely sintered with each other, abnormal particle growth is caused, and the proportion of irregular coarse particles increases in some cases.

(Firing Time)

The maintenance time at the firing temperature described above in the firing time is set to preferably 2 hours or more, more preferably 4 hours or more and 10 hours or less. When the maintenance time at the firing temperature is less than 2 hours, it is concerned that lithium does not sufficiently diffuse into the precursor particles, and excess lithium and the unreacted precursor remain or the crystallinity of the lithium-metal composite oxide obtained is insufficient. On the other hand, when the maintenance time exceeds 10 hours, diffusion of transition metal elements (Ni, Co, Mn and the like) proceeds, the core-shell structure is lost, and the intended battery characteristics are not attained in some cases. The firing time can be appropriately adjusted in the above firing temperature range so that the second particles having a core-shell structure are obtained.

The rate of temperature increase in the firing process (step S40) is set to preferably 2° C./min to 10° C./min, more preferably 3° C./min to 10° C./min. It is preferable that the lithium mixture is maintained at a temperature close to the melting point of the lithium compound for preferably 1 hour to 5 hours, more preferably 2 hours to 5 hours during the firing process. This makes it possible to more uniformly react the precursor with the lithium compound.

The cooling rate from the firing temperature to at least 200° C. after termination of the maintenance time is set to preferably 2° C./min or more and 10° C./min or less, more preferably 3° C./min or more and 7° C./min or less. By controlling the cooling rate to be in the above range, it is possible to prevent the facilities such as the sagger from being damaged by rapid cooling while securing the productivity of positive electrode active material.

(Firing Atmosphere)

The atmosphere at the time of firing is set to preferably an oxidizing atmosphere, more preferably an atmosphere having an oxygen concentration of 18 vol % or more and 100 vol % or less, particularly preferably a mixed atmosphere of oxygen having the above oxygen concentration and an inert gas. In other words, firing is preferably performed in the air or an oxygen flow. When the oxygen concentration is less than 18 vol %, it is concerned that the crystallinity of lithium-metal composite oxide is insufficient.

The furnace used in the firing process (step S40) is not particularly limited as long as it can heat the lithium mixture in the air or an oxygen flow. However, from the viewpoint of maintaining the atmosphere in the furnace uniformly, an electric furnace which does not cause gas generation is preferable and both a batch type electric furnace and a continuous type electric furnace can be suitably used. The same applies to the furnace used in the heat treatment process and the calcination process to be described below.

[Calcination Process]

When lithium hydroxide and lithium carbonate are used as the lithium compound, a calcination process of calcining the lithium mixture may be performed after the mixing process (step S30) and before the firing process (step S40). As calcination, a heat treatment can be performed at, for example, a temperature lower than the firing temperature in the firing process (step S40) and 350° C. or more and 800° C. or less, preferably 450° C. or more and 780° C. or less. When the calcination process is performed, it is possible to sufficiently diffuse lithium into the precursor and to obtain more uniform particles of lithium-metal composite oxide.

In the calcination process, the maintenance time at the above temperature is set to preferably 1 hour or more and 10 hours or less, more preferably 3 hours or more and 6 hours or less. The atmosphere in the calcination process is set to preferably an oxidizing atmosphere, more preferably an atmosphere having an oxygen concentration of 18 vol % or more and 100 vol % or less in the same manner as in the firing process to be described later.

[Crushing Process]

The lithium-metal composite oxide obtained by the firing process (Step S40) may be used as it is as the positive electrode active material. When aggregation or slight sintering of the lithium-metal composite oxide in the firing process (step S40) has occurred, the lithium-metal composite oxide may be subjected to a process (crushing process) of crushing the lithium-metal composite oxide and then used as a positive electrode active material. When the crushing process is performed, it is possible to adjust the average particle size and particle size distribution of the obtained lithium-metal composite oxide to suitable ranges. Crushing means operation to apply mechanical energy to the aggregate which is formed of a plurality of secondary particles generated by sintering necking between the secondary particles at the time of firing and to separate the secondary particles from each other while hardly destroying the secondary particles themselves, and to loosen the aggregate. As the method of crushing, a known means can be used and, for example, a pin mill and a hammer mill can be used. It is preferable to adjust the crushing force to a proper range so as not to destroy the secondary particles at this time.

5. Non-Aqueous Electrolyte Secondary Battery

The non-aqueous electrolyte secondary battery (hereinafter, also referred to as "secondary battery") according to the present embodiment includes a positive electrode, a negative electrode, and a non-aqueous electrolyte, and the positive electrode contains the positive electrode active material described above. The secondary battery according to the present embodiment may include, for example, a positive electrode, a negative electrode, a separator, and a non-aqueous electrolyte solution or may include a positive electrode, a negative electrode, and a solid electrolyte. The secondary battery may be any secondary battery which is charged and discharged by de-insertion and insertion of lithium ions and may be, for example, a non-aqueous electrolyte secondary battery or an all-solid-state lithium secondary battery. The secondary battery may include similar components to those of a known lithium-ion secondary battery.

Hereinafter, as an example of the secondary battery according to the present embodiment, the respective constituent materials of the secondary battery containing a non-aqueous electrolyte solution and the production method thereof will be described. Note that an embodiment described below is merely an example, and the method for producing a secondary battery can be implemented in various modified forms or improved forms on the basis of knowledge of those skilled in the art on the basis of the embodiment described here. Use of the secondary battery obtained by the production method according to the present embodiment is not particularly limited.

(Positive Electrode)

The positive electrode contains the positive electrode active material described above. The positive electrode can be produced, for example, as follows. The method for fabricating the positive electrode is not limited to the following method, and other methods may be adopted.

First, the positive electrode active material, a conductive material, and a binder (binding agent) are mixed together, activated carbon and a solvent for viscosity adjustment or the like are further added thereto if necessary, and this mixture is kneaded to fabricate a positive electrode mixture paste. The constituent materials of the positive electrode mixture paste are not particularly limited, and materials equivalent to those of a known positive electrode mixture paste may be used.

The mixing ratio of the respective materials in the positive electrode mixture paste is not particularly limited and is appropriately adjusted depending on the required performance of the secondary battery. The mixing ratio of the materials can be in a similar range to that in a known positive electrode mixture paste for secondary batteries. For example, when the total mass of solids in the positive electrode mixture excluding the solvent is 100 parts by mass, the content of the positive electrode active material may be 60 parts by mass or more and 95 parts by mass or less, the content of the conductive material may be 1 part by mass or more and 20 parts by mass or less, and the content of the binder may be 1 part by mass or more and 20 parts by mass or less.

Examples of the conductive agent include graphite (natural graphite, artificial graphite, expanded graphite, and the like), and a carbon black-based material such as acetylene black or ketjen black.

The binder (binding agent) plays a role of bonding active material particles together, and examples thereof include polyvinylidene fluoride (PVDF), polytetrafluoroethylene (PTFE), fluorine-containing rubber, ethylene propylene diene rubber, styrene butadiene, a cellulose-based resin, and polyacrylic acid.

If necessary, a solvent which disperses the positive electrode active material, the conductive material, and activated carbon and dissolves the binder (binding agent) may be added to the positive electrode mixture paste. As the solvent, specifically, an organic solvent such as N-methyl-2-pyrrolidone (NMP) may be used. Activated carbon may be added to the positive electrode mixture in order to increase electric double layer capacity.

Next, the obtained positive electrode mixture paste is applied to, for example, the surface of an aluminum foil current collector and dried to scatter the solvent, thereby fabricating a sheet-like positive electrode.

Pressurization may be performed by roll press or the like in order to increase electrode density if necessary. The sheet-like positive electrode can be cut into an appropriate size depending on the intended battery and used in the fabrication of the battery.

(Negative Electrode)

As the negative electrode, metal lithium, a lithium alloy and the like may be used. As the negative electrode, a negative electrode may be used which is formed by mixing a binding agent with a negative electrode active material which can insert and de-insert lithium ions, adding an appropriate solvent thereto to form a paste-like negative electrode mixture, coating the surface of a metal foil current collector such as copper with the paste-like negative electrode mixture, drying the coated metal foil current collector, and compressing the resultant metal foil current collector in order to increase the electrode density if necessary.

As the negative electrode active material, natural graphite, artificial graphite, a fired organic compound such as a phenol resin, and a powdery carbon material such as coke can be used. As the negative electrode binding agent, a fluorine-containing resin such as PVDF can be used in the same manner as in the positive electrode. An organic solvent such as N-methyl-2-pyrrolidone can be used as a solvent for dispersing these active material and binding agent.

(Separator)

A separator is disposed by being interposed between the positive electrode and the negative electrode. The separator separates the positive electrode and the negative electrode from each other and retains the electrolyte, and a thin film which is formed of polyethylene, polypropylene, or the like and has a large number of minute holes can be used.

(Non-Aqueous Electrolyte Solution)

The non-aqueous electrolyte solution is obtained by dissolving a lithium salt as a supporting salt in an organic solvent. As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sultone and butane sultone, and phosphorus compounds such as triethyl phosphate and trioctyl phosphate can be used singly or two or more of these can be used in mixture.

As the supporting salt, $LiPF_6$, $LiBF_4$, $LiClO_4$, $LiAsF_6$, $LiN(CF_3SO_2)_2$, and a composite salt of these can be used. The non-aqueous electrolyte solution may contain a radical scavenger, a surfactant, a flame retardant, and the like.

[Solid Electrolyte]

As the non-aqueous electrolyte, a solid electrolyte may be used. The solid electrolyte has the property of withstanding a high voltage. Examples of the solid electrolyte include an inorganic solid electrolyte and an organic solid electrolyte.

Examples of the inorganic solid electrolyte include an oxide-based solid electrolyte and a sulfide solid electrolyte.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from the group consisting of lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$–$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3-X}TiO_3$ ($0 \leq X \leq \frac{2}{3}$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from the group consisting of $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$ can be used.

As the inorganic solid electrolyte, inorganic solid electrolytes other than those described above may be used and, for example, $Li_3N$, $LiI$, $Li_3N$—$LiI$—$LiOH$ and the like may be used.

The organic solid electrolyte is not particularly limited as long as it is a polymer compound exhibiting ionic conductivity, and for example, polyethylene oxide, polypropylene oxide, and copolymers of these can be used. The organic solid electrolyte may contain a supporting salt (lithium salt).

It is also possible to configure the secondary battery by using a solid electrolyte instead of the non-aqueous electrolyte solution. A solid electrolyte is not decomposed even at a high potential, does not cause gas generation and thermal runaway due to decomposition of the electrolyte solution at the time of charge, which are observed in a non-aqueous electrolyte solution, and thus exhibits high thermal stability. For this reason, when the lithium ion secondary battery fabricated using the positive electrode active material according to the present invention is used, a secondary battery exhibiting higher thermal stability can be obtained.

(Shape and Configuration of Battery)

The non-aqueous electrolyte secondary battery according to the present embodiment including the positive electrode, the negative electrode, and the non-aqueous electrolyte which have been described above can have various shapes such as a cylindrical shape and a laminated shape. Even when the non-aqueous electrolyte secondary battery has any shape, the positive electrode and the negative electrode are laminated with the separator interposed therebetween to form an electrode body, the obtained electrode body is impregnated with the non-aqueous electrolyte solution, a positive electrode current collector is connected to a positive electrode terminal communicating with the outside using a current collecting lead or the like, a negative electrode current collector is connected to a negative electrode terminal communicating with the outside using a current collecting lead or the like, and the resultant product is sealed in a battery case to complete the non-aqueous electrolyte secondary battery.

The secondary battery according to the present embodiment is not limited to the form in which a non-aqueous electrolyte solution is used as the non-aqueous electrolyte but may be, for example, a secondary battery in which a solid non-aqueous electrolyte is used, namely, an all-solid-state battery. In the case of an all-solid-state battery, the configuration other than the positive electrode active material can be changed if necessary. When a solid electrolyte is adopted, the solid electrolyte may also serve as a separator.

(Characteristics of Non-Aqueous Electrolyte Secondary Battery)

The non-aqueous electrolyte secondary battery of the present embodiment exhibits excellent battery capacity, thermal stability, and weather resistance since the above-described positive electrode active material is used as a positive electrode material therein. Moreover, it can be said that the non-aqueous electrolyte secondary battery of the present embodiment is superior in battery capacity, thermal stability, and weather resistance to a secondary battery in which a positive electrode active material containing a conventional lithium-nickel composite oxide is used as well.

(Use)

The non-aqueous electrolyte secondary battery of the present invention exhibits excellent battery capacity, thermal stability, and weather resistance as described above and can be suitably utilized as a power source for small-sized portable electronic devices (notebook personal computers, mobile phones and the like) which are required to exhibit these characteristics at high levels. The non-aqueous electrolyte secondary battery of the present invention also exhibits excellent thermal stability, not only can be decreased in size and have a high output but also can simplify an expensive protection circuit, and thus can be suitably utilized as a power source for transportation equipment to be mounted in a restricted space.

EXAMPLES

Hereinafter, the method for producing the metal composite hydroxide and positive electrode active material according to the present invention will be described with reference to Examples, but the present invention is not limited to these Examples.

In the following Examples and Comparative Examples, the respective reagent grade samples manufactured by FUJI-FILM Wako Pure Chemical Corporation were used in the fabrication of composite hydroxide particles and positive electrode active materials unless otherwise stated. Throughout the nuclear generation process and particle growth process, the pH value of the reaction aqueous solution was measured using a pH controller (NPH-690D manufactured by Nisshin Rika Co., Ltd.) and the amount of sodium hydroxide aqueous solution supplied was adjusted based on this measured value to control the fluctuation range of pH value of the reaction aqueous solution in each process in a range of ±0.2.

Example 1

1. Production of Metal Composite Hydroxide

[Preparation of First and Second Raw Material Aqueous Solutions]

As a first raw material aqueous solution, an aqueous solution having a concentration of 2 mol/L was prepared by dissolving nickel sulfate, cobalt sulfate, and manganese sulfate in water so that the molar ratio of the respective metal elements was Ni:Co:Mn=88:9:3. As a second raw material aqueous solution, an aqueous solution having a concentration of 2 mol/L was prepared by dissolving nickel sulfate, cobalt sulfate, and manganese sulfate in water so that the molar ratio of the respective metal elements was Ni:Co:Mn=45:10:45.

[First Crystallization Process]

First, 14 L of water was put in a 60 L reaction tank, and the internal temperature of the tank was set to 40° C. while stirring the water. At this time, nitrogen gas was allowed to flow in the reaction tank for 30 minutes to set the reaction atmosphere to a non-oxidizing atmosphere having an oxygen concentration of 2 vol % or less. Subsequently, appropriate amounts of 25 mass % sodium hydroxide aqueous solution and 25 mass % ammonia water were supplied into the reaction tank, and the pH value was adjusted to 12.5 at a liquid temperature of 25° C. and the ammonium ion concentration was adjusted to 10 g/L to form a pre-reaction aqueous solution.

Next, the first raw material aqueous solution, 25 mass % sodium hydroxide aqueous solution, and 25 mass % ammonia water were simultaneously added to the reaction tank, the pH value was maintained at 12.5 at a liquid temperature of 25° C., the ammonium ion concentration was maintained at 10 g/L, and the reaction temperature was maintain at 40° C., and a metal composite hydroxide was formed by a continuous crystallization method in which continuous coprecipitation was performed. After the reaction tank reached the steady state, the slurry (reaction aqueous solution) containing the metal composite hydroxide (mainly the core portion of the first particles) was collected from the overflow. The product in the reaction aqueous solution was 90 to 110 g/L.

[Second Crystallization Process]

A predetermined amount of the slurry (reaction aqueous solution) containing the core portion obtained in the first crystallization was transferred to a 60 L reaction tank (batch type crystallize apparatus) different from the one used in the first crystallization, and the pH value of the slurry was adjusted to 11.6 at a liquid temperature of 25° C. by adding sulfuric acid thereto to form a reaction aqueous solution for shell portion crystallization. After it was confirmed that the pH value reached the predetermined value (11.6), the second raw material aqueous solution, 25 mass % sodium hydroxide aqueous solution, and 25 mass % ammonia water were simultaneously added to the reaction tank, and the shell portion was grown on the surface of the particles (mainly the core portion of the first particles) obtained in the first crystallization process. The reaction atmosphere, reaction temperature, and ammonium ion concentration in the second crystallization process were set to be similar to those in the first crystallization process.

In the crystallization process, the amounts of the first and second raw material aqueous solutions supplied were adjusted so that the amount of metal elements supplied in each process with respect to the total amount of metal elements supplied was first crystallization process:second crystallization process=75 mol %:25 mol %.

2. Evaluation of Metal Composite Hydroxide

[Composition]

It has been confirmed that the metal composite hydroxide obtained is represented by a general formula: $Ni_{0.773}Co_{0.092}Mn_{0.135}(OH)_2$ by analysis using an ICP atomic emission spectrometer (ICPE-9000 manufactured by Shimadzu Corporation).

[Average Particle Size and Particle Size Distribution]

The average particle size of the metal composite hydroxide was measured using a laser light diffraction scattering particle size analyzer (Microtrac HRA manufactured by Nikkiso Co., Ltd.) as well as D10 and D90 were measured, and [(D90–D10)/MV] that was an index indicating the spread of particle size distribution was calculated. The results are presented in Table 1.

[Particle Structure]

A part of the metal composite hydroxide was embedded in a resin, subjected to focused ion beam processing so that the cross section was observable, and then observed under STEM-EDX (HD-2300A manufactured by Hitachi High-Tech Corporation) (see FIG. 6). As a result, it has been confirmed that among the observable metal composite hydroxides, the metal composite hydroxide having a cross-sectional particle size in the range of volume average particle diameter (MV) (±10%) contains secondary particles with a plurality of aggregated primary particles and has a core-shell structure having a core portion having a thickness to be 84% of the radius of the secondary particles and a shell portion having a thickness to be 16% of the radius of the secondary particles in the direction from the surface to the center of the particle.

3. Production of Positive Electrode Active Material

The obtained metal composite hydroxide (precursor) was subjected to a heat treatment at 120° C. for 12 hours in an air (oxygen concentration: 21 vol % by volume) flow (heat treatment process). The precursor after the heat treatment was sufficiently mixed with lithium hydroxide so that Li/Me was 1.01 to obtain a lithium mixture (mixing process). Mixing was performed using a shaker mixer (TURBULA TypeT2C manufactured by Willy A. Bachofen (WAB)).

The obtained lithium mixture was heated in an oxygen (oxygen concentration: 100 vol %) flow to 800° C. at a rate of temperature increase of 3° C./min, fired by being maintained at this temperature for 6 hours, and then cooled to room temperature at a cooling rate of about 4° C./min to obtain a positive electrode active material (firing process). The positive electrode active material obtained was in an aggregated or slightly sintered state. For this reason, this positive electrode active material was crushed and the average particle size and particle size distribution thereof were adjusted (crushing process).

[Composition]

It has been confirmed that this positive electrode active material is represented by a general formula: $Li_{1.01}Ni_{0.77}Co_{0.09}Mn_{0.14}O_2$ by analysis using an ICP atomic emission spectrometer.

[Particle Structure]

A part of this positive electrode active material was embedded in a resin, subjected to focused ion beam processing so that the cross section was observable, and then observed under STEM-EDX (HD-2300A manufactured by Hitachi High-Tech Corporation). As a result, it has been confirmed that among the observable positive electrode active materials, the positive electrode active material having a cross-sectional particle size in the range of volume average particle diameter (MV) (±10%) contains secondary particles with a plurality of aggregated primary particles and has a core-shell structure having a core portion having a thickness to be 87% of the radius of the secondary particles and a shell portion having a thickness to be 13% of the radius of the secondary particles in the direction from the surface to the center of the particle.

[Average Particle Size and Particle Size Distribution]

The average particle size of the positive electrode active material was measured using a laser light diffraction scattering particle size analyzer (Microtrac HRA manufactured by Nikkiso Co., Ltd.) as well as D10 and D90 were measured, and [(D90–D10)/MV] that was an index indicating the spread of particle size distribution was calculated. The results are presented in Table 2.

[Specific Surface Area and Tap Density]

The specific surface area was measured using a flow system gas adsorption method specific surface area measuring apparatus (Multisorb manufactured by Yuasa Ionics Co., Ltd.) and the tap density was measured using a tapping machine (KRS-406 manufactured by Kuramochi Kagakukikai Seisakusho). The results are presented in Table 2.

[Weather Resistance]

Using a thermostatic and humidifying chamber (IW242 manufactured by Yamato Scientific Co., Ltd.), 10 g of the positive electrode active material was stored in an environment of 25° C. and RH 50% for 24 hours, and the moisture content was evaluated by the Karl Fischer titration method. As a result, the moisture content after 24 hours of storage was 0.08%.

4. Fabrication of Secondary Battery

The positive electrode active material obtained as described above: 52.5 mg, acetylene black: 15 mg, and PTEE: 7.5 mg were mixed together, press-molded at a pressure of 100 MPa to have a diameter of 11 mm and a thickness of 100 μm, and then dried in a vacuum dryer at 120° C. for 12 hours to fabricate positive electrode PE.

Next, 2032 type coin-type battery CBA was fabricated using this positive electrode PE in a glove box in an Ar atmosphere of which the dew point was managed at −80° C. Lithium metal having a diameter of 17 mm and a thickness of 1 mm was used as negative electrode NE of this 2032 type coin-type battery CBA, and an equivalent mixed solution (manufactured by TOMIYAMA PURE CHEMICAL INDUSTRIES, LTD.) of ethylene carbonate (EC) and diethyl carbonate (DEC) containing 1 M $LiClO_4$ as a supporting electrolyte was used as the electrolyte solution. A polyethylene porous film having a thickness of 25 μm was used as separator SE. The 2032 type coin-type battery CBA has gasket GA and is assembled into a coin-shaped battery using positive electrode can PC and negative electrode can NC.

5. Battery Evaluation

[Initial Charge and Discharge Capacity]

The capacity when a 2032 type coin-type battery CBA was left to stand for about 24 hours after being fabricated to stabilize the open circuit voltage (OCV) and then charged to a cutoff voltage of 4.3 V at a current density of 0.1 mA/cm² with respect to the positive electrode was taken as the initial charge capacity, the battery paused for one hour, and then the discharge capacity when the battery was discharged to a cutoff voltage of 3.0 V was measured to perform a charge and discharge test, whereby the initial charge and discharge capacity was determined. The results are presented in Table 2. A multi-channel voltage/current generator (R6741A manufactured by Advantest Corporation) was used for the measurement of the initial discharge capacity.

[Thermal Stability]

The thermal stability of the positive electrode was evaluated by quantitatively determining the amount of oxygen released when the positive electrode active material in an overcharged state was heated. The 2032 type coin-type battery was fabricated and subjected to CCCV charge (constant current-constant voltage charge) at a 0.2 C rate up to a cutoff voltage of 4.5V. Thereafter, the coin-type battery was disassembled, only the positive electrode was carefully taken out so as not to cause a short circuit, washed with DMC (dimethyl carbonate), and dried. About 2 mg of the dried positive electrode was weighed and heated from room temperature to 450° C. at a rate of temperature increase of 10° C./min using a gas chromatograph mass spectrometer (GCMS, QP-2010plus manufactured by Shimadzu Corporation). Helium was used as the carrier gas. The generation behavior of oxygen (m/z=32) generated at the time of heating was measured, and the semi-quantitative determination of the oxygen generation amount was performed from the obtained maximum oxygen generation peak height and peak area, and these were used as evaluation indices for thermal stability. The semi-quantitative value of the oxygen generation amount was calculated by injecting pure oxygen gas as a standard sample into GCMS and extrapolating the calibration curve attained from the measurement results. As a result, an amount of oxygen released of 7.6 wt % has been confirmed.

Example 2

A metal composite hydroxide, a positive electrode active material, and a secondary battery were obtained and evaluated in the same manner as in Example 1 except that the amounts of the first and second raw material aqueous solutions supplied were adjusted so that the amount of metal elements supplied in each process with respect to the total amount of metal elements supplied was first crystallization process:second crystallization process=65 mol %:35 mol % in the crystallization process. The results are presented in Tables 1 and 2.

Example 3

A metal composite hydroxide, a positive electrode active material, and a secondary battery were obtained and evaluated in the same manner as in Example 1 except that the amounts of the first and second raw material aqueous solutions supplied were adjusted so that the amount of metal elements supplied in each process with respect to the total amount of metal elements supplied was first crystallization process:second crystallization process=85 mol %:15 mol % in the crystallization process. The results are presented in Tables 1 and 2.

Example 4

A metal composite hydroxide, a positive electrode active material, and a secondary battery were obtained and evaluated in the same manner as in Example 1 except that the ratio (molar ratio) of the number of atoms of the metal elements contained in the first raw material aqueous solution was adjusted to Ni:Co:Mn=94:3:3 in the first crystallization process (core portion formation). The results are presented in Tables 1 and 2.

Example 5

A metal composite hydroxide, a positive electrode active material, and a secondary battery were obtained and evaluated in the same manner as in Example 1 except that the ratio (molar ratio) of the number of atoms of the metal elements contained in the first raw material aqueous solution was adjusted to Ni:Co:Mn=70:15:15 in the first crystallization process (core portion formation). The results are presented in Tables 1 and 2.

Example 6

A metal composite hydroxide, a positive electrode active material, and a secondary battery were obtained and evaluated in the same manner as in Example 1 except that the ratio (molar ratio) of the number of atoms of the metal elements contained in the second raw material aqueous solution was adjusted to Ni:Co:Mn=55:25:20 in the second crystallization process (shell portion formation). The results are presented in Tables 1 and 2.

Example 7

A positive electrode active material and a secondary battery were obtained and evaluated in the same manner as in Example 1 except that a metal composite hydroxide similar to that in Example 1 was used and the firing temperature was set to 900° C. in the firing process. The results are presented in Table 2.

Example 8

A positive electrode active material and a secondary battery were obtained and evaluated in the same manner as in Example 1 except that a metal composite hydroxide similar to that in Example 1 was used and the firing temperature was set to 650° C. in the firing process. The results are presented in Table 2.

Comparative Example 1

A metal composite hydroxide, a positive electrode active material, and a secondary battery were obtained and evaluated in the same manner as in Example 1 except that the amounts of the first and second raw material aqueous solutions supplied were adjusted so that the amount of metal elements supplied in each process with respect to the total amount of metal elements supplied was first crystallization process:second crystallization process=60 mol %:40 mol % in the crystallization process. The results are presented in Tables 1 and 2.

Comparative Example 2

A metal composite hydroxide, a positive electrode active material, and a secondary battery were obtained and evaluated in the same manner as in Example 1 except that the amounts of the first and second raw material aqueous solutions supplied were adjusted so that the amount of metal elements supplied in each process with respect to the total amount of metal elements supplied was first crystallization process:second crystallization process=90 mol %:10 mol % in the crystallization process. The results are presented in Tables 1 and 2.

Comparative Example 3

A metal composite hydroxide, a positive electrode active material, and a secondary battery were obtained and evaluated in the same manner as in Example 1 except that the ratio (molar ratio) of the number of atoms of the metal elements contained in the first raw material aqueous solution was adjusted to Ni:Co:Mn=97:2:1 in the first crystallization process (core portion formation). The results are presented in Tables 1 and 2.

Comparative Example 4

A metal composite hydroxide, a positive electrode active material, and a secondary battery were obtained and evaluated in the same manner as in Example 1 except that the ratio (molar ratio) of the number of atoms of the metal elements contained in the first raw material aqueous solution was adjusted to Ni:Co:Mn=38:31:31 in the first crystallization process (core portion formation) and the ratio (molar ratio) of the number of atoms of the metal elements contained in the second raw material aqueous solution was adjusted to Ni:Co:Mn=40:20:40. The results are presented in Tables 1 and 2.

Comparative Example 5

A metal composite hydroxide, a positive electrode active material, and a secondary battery were obtained and evaluated in the same manner as in Example 1 except that the ratio (molar ratio) of the number of atoms of the metal elements contained in the second raw material aqueous solution was adjusted to Ni:Co:Mn=60:10:30 in the second crystallization process (shell portion formation). The results are presented in Tables 1 and 2.

Comparative Example 6

A metal composite hydroxide, a positive electrode active material, and a secondary battery were obtained and evaluated in the same manner as in Example 1 except that a metal composite hydroxide similar to that in Example 1 was used and the firing temperature was set to 920° C. in the firing process. The results are presented in Tables 2 and 3.

Comparative Example 7

A positive electrode active material and a secondary battery were obtained and evaluated in the same manner as in Example 1 except that a metal composite hydroxide similar to that in Example 1 was used and the firing temperature was set to 630° C. in the firing process. The results are presented in Table 2.

Comparative Example 8

A metal composite hydroxide, a positive electrode active material, and a secondary battery were obtained and evaluated in the same manner as in Example 1 except that the ratio (molar ratio) of the number of atoms of the metal elements contained in each of the first and second raw material aqueous solutions was adjusted to Ni:Co:Mn=77:9:14 in the crystallization process and the first and second crystallization processes were performed using raw material aqueous solutions having the same ratio of the number of atoms of the metal elements as each other. The results are presented in Tables 1 and 2.

TABLE 1

| | Metal composite hydroxide (entire) | | | | First particle | | | | | | | Shell | |
| | Composition | | | Volume Average particle size μm | (D90 − D10)/Mv — | Composition of core portion | | | Composition of shell portion | | | Shell portion Thickness μm | Shell portion thickness/volume radius % |
| | Ni 1 − x − y | Co x | Mn y | | | Ni 1 − x₁ − y₁ | Co x₁ | Mn y₁ | Ni 1 − x₂ − y₂ | Co x₂ | Mn y₂ | | |
|---|---|---|---|---|---|---|---|---|---|---|---|---|---|
| Example 1 | 0.77 | 0.09 | 0.14 | 11.2 | 0.94 | 0.88 | 0.09 | 0.03 | 0.45 | 0.1 | 0.45 | 0.9 | 16 |
| Example 2 | 0.73 | 0.09 | 0.18 | 11.3 | 0.95 | 0.88 | 0.09 | 0.03 | 0.45 | 0.1 | 0.45 | 1.6 | 28 |
| Example 3 | 0.82 | 0.09 | 0.09 | 10.9 | 0.91 | 0.88 | 0.09 | 0.03 | 0.45 | 0.1 | 0.45 | 0.6 | 11 |
| Example 4 | 0.81 | 0.05 | 0.14 | 11.4 | 0.97 | 0.94 | 0.03 | 0.03 | 0.45 | 0.1 | 0.45 | 0.9 | 17 |
| Example 5 | 0.64 | 0.14 | 0.22 | 11.3 | 0.95 | 0.7 | 0.15 | 0.15 | 0.45 | 0.1 | 0.45 | 0.9 | 16 |
| Example 6 | 0.80 | 0.13 | 0.07 | 11.5 | 1.03 | 0.88 | 0.09 | 0.03 | 0.55 | 0.25 | 0.2 | 0.8 | 14 |
| Comparative Example 1 | 0.77 | 0.09 | 0.14 | 11.2 | 1.01 | 0.88 | 0.09 | 0.03 | 0.45 | 0.1 | 0.45 | 2.4 | 43 |
| Comparative Example 2 | 0.84 | 0.09 | 0.07 | 11.4 | 0.95 | 0.88 | 0.09 | 0.03 | 0.45 | 0.1 | 0.45 | 0.5 | 8 |
| Comparative Example 3 | 0.84 | 0.04 | 0.12 | 11.3 | 1.03 | 0.97 | 0.02 | 0.01 | 0.45 | 0.1 | 0.45 | 0.9 | 17 |
| Comparative Example 4 | 0.39 | 0.28 | 0.33 | 11.1 | 1.04 | 0.38 | 0.31 | 0.31 | 0.4 | 0.2 | 0.4 | 0.8 | 15 |
| Comparative Example 5 | 0.80 | 0.13 | 0.07 | 11.5 | 0.92 | 0.88 | 0.09 | 0.03 | 0.6 | 0.1 | 0.3 | 0.8 | 14 |
| Comparative Example 8 | 0.77 | 0.09 | 0.14 | 11.4 | 1.01 | — | — | — | — | — | — | — | — |

TABLE 2

| | Lithium-metal composite oxide (entire) | | | | | First particle Shell | | Battery evaluation | | | 24 hours |
| | Firing temperature ° C. | Li/Me | Volume Average particle size μm | (D90 − D10)/ Mv — | Specific surface area m²/g | Tap density g/cm³ | Shell portion thickness μm | Shell portion thickness/ volume radius % | Charge capacity mAh/g | Discharge capacity mAh/g | Oxygen Release amount wt % | After exposure Moisture content wt % |
|---|---|---|---|---|---|---|---|---|---|---|---|---|
| Example 1 | 800 | 1.01 | 11.1 | 0.94 | 1.32 | 2.57 | 0.7 | 13 | 214.3 | 191.4 | 7.6 | 0.08 |
| Example 2 | 800 | 1.01 | 10.9 | 0.95 | 1.05 | 2.41 | 1.1 | 19 | 206.4 | 187 | 6.9 | 0.07 |
| Example 3 | 800 | 1.01 | 11.3 | 0.91 | 1.13 | 2.68 | 0.6 | 10 | 216.6 | 194.2 | 7.8 | 0.12 |

TABLE 2-continued

| | | Lithium-metal composite oxide (entire) | | | | | First particle Shell | | Battery evaluation | | | 24 hours |
|---|---|---|---|---|---|---|---|---|---|---|---|---|
| | Firing temperature ° C. | Li/Me | Volume Average particle size μm | (D90 – D10)/Mv — | Specific surface area m²/g | Tap density g/cm³ | Shell portion thickness μm | Shell portion thickness/ volume radius % | Charge capacity mAh/g | Discharge capacity mAh/g | Oxygen Release amount wt % | After exposure Moisture content wt % |
| Example 4 | 750 | 1.01 | 11.3 | 0.97 | 1.36 | 2.51 | 0.8 | 14 | 214 | 193 | 7.2 | 0.11 |
| Example 5 | 850 | 1.01 | 11.1 | 0.95 | 0.96 | 2.72 | 0.7 | 12 | 201.2 | 180.3 | 6.3 | 0.06 |
| Example 6 | 760 | 1.01 | 11.4 | 1.03 | 1.41 | 2.64 | 0.8 | 14 | 211.3 | 192.4 | 7.1 | 0.12 |
| Example 7* | 900 | 1.01 | 11.4 | 0.94 | 0.9 | 2.81 | 0.7 | 11 | 216 | 189.1 | 7.8 | 0.13 |
| Example 8* | 650 | 1.01 | 11.1 | 1.08 | 2.04 | 2.37 | 0.9 | 16 | 204.5 | 184.2 | 6.2 | 0.06 |
| Comparative Example 1 | 800 | 1.01 | 11.4 | 1.01 | 1.25 | 2.28 | 2.3 | 41 | 199.2 | 172.3 | 6.4 | 0.06 |
| Comparative Example 2 | 800 | 1.01 | 11.3 | 0.95 | 0.98 | 2.67 | 0.3 | 5 | 218.1 | 195.3 | 20.2 | 0.26 |
| Comparative Example 3 | 750 | 1.01 | 11.2 | 1.03 | 1.41 | 2.46 | 0.8 | 15 | 217.3 | 195.2 | 20.0 | 0.26 |
| Comparative Example 4 | 850 | 1.01 | 10.9 | 1.04 | 1.21 | 2.61 | 0.7 | 12 | 181 | 163.1 | 5.0 | 0.08 |
| Comparative Example 5 | 800 | 1.01 | 11.2 | 0.92 | 1.22 | 2.11 | 0.7 | 12 | 210.9 | 189 | 17.4 | 0.22 |
| Comparative Example 6* | 920 | 1.01 | 11.2 | 0.94 | 0.88 | 2.74 | 0.3 | 6 | 213.2 | 191.4 | 16.2 | 0.38 |
| Comparative Example 7* | 630 | 1.01 | 11.1 | 0.96 | 2.35 | 2.23 | 0.9 | 16 | 192 | 174.9 | 8.3 | 0.30 |
| Comparative Example 8 | 800 | 1.01 | 11.4 | 1.01 | 1.22 | 2.67 | — | — | 208.1 | 189.2 | 12.6 | 0.40 |

*In Examples 7 and 8 and Comparative Examples 6 and 7, a metal composite hydroxide similar to that in Example 1 was used.

(Evaluation Results)

In the positive electrode active material obtained using the metal composite hydroxide obtained in Examples as a precursor, the moisture content after 24 hours of exposure, which was an index of weather resistance, was low. In the battery for evaluation, the initial charge and discharge capacity was high and the amount of oxygen released, which was an index of thermal stability, was small. Consequently, in the positive electrode active material obtained using the metal composite hydroxide obtained in Examples as a precursor, it has been indicated that high charge and discharge capacity, high thermal stability, and weather resistance in a secondary battery can be achieved at high levels.

On the other hand, in the metal composite hydroxide and positive electrode active material obtained in Comparative Example 1, the thicknesses of the shell portions having a low nickel ratio exceeded 40%, respectively, and the initial charge and discharge capacity was lower even as compared to Example 5 (total nickel ratio: 64 mol %) in which the nickel ratio (molar ratio to the entire metals excluding lithium) in the overall composition was lower. In the metal composite hydroxide and positive electrode active material obtained in Comparative Example 2, the thicknesses of the shell portions having a low nickel ratio were less than 10%, respectively, and the thermal stability and weather resistance were not sufficient.

In the metal composite hydroxide and positive electrode active material obtained in Comparative Example 3, the nickel ratio at the core portion was 97 mol % and the thermal stability and weather resistance were not sufficient. In the metal composite hydroxide and positive electrode active material obtained in Comparative Example 4, the nickel ratio at the core portion was less than 40 mol % and high initial charge and discharge capacity was not attained.

In the metal composite hydroxide and positive electrode active material obtained in Comparative Example 5, the nickel ratio at the shell portion was 60 mol %, thus the thermal stability and weather resistance were not sufficient, and the initial charge and discharge capacity was also lower as compared to Example 1 (total nickel ratio: 77 mol %) in which the nickel ratio in the overall composition was lower.

In the positive electrode active material obtained in Comparative Example 6, the firing temperature exceeded 900° C. and the thermal stability and weather resistance were not sufficient as compared to the positive electrode active material of Example 1 in which a metal composite hydroxide similar to that in Comparative Example 6 was used as a precursor. In the positive electrode active material obtained in Comparative Example 7, the firing temperature was less than 650° C. and the initial charge and discharge capacity was lower as compared to the positive electrode active material of Example 1 in which a metal composite hydroxide similar to that in Comparative Example 7 was used as a precursor.

The positive electrode active material obtained in Comparative Example 8 had an overall composition similar to that of the positive electrode active material of Example 1, but does not have a core-shell structure, and has a uniform composition inside the particles, thus the thermal stability and weather resistance were lower and the initial charge and discharge capacity was also lower as compared to the positive electrode active material of Example 1.

Note that the technical scope of the present invention is not limited to the modes described in the embodiments and the like. One or more of the requirements described in the embodiments and the like may be omitted. In addition, the requirements described in the embodiments and the like can be combined as appropriate. In addition, to the extent permitted by law, the disclosure of Japanese Patent Application No. 2018-029555, which is a Japanese patent application, and all the literatures cited in this specification is incorporated as part of the description of the text.

REFERENCE SIGNS LIST

10 Metal composite hydroxide
11 First particle
11$a$ Core portion
11$b$ Shell portion
C Center
t Thickness of shell portion
$R_{11}$ Radius of first particle
$R_{11a}$ Radius of core portion
CBA Coin-type battery
PC Positive electrode can
NC Negative electrode can
GA Gasket
PE Positive electrode
NE Negative electrode
SE Separator

The invention claimed is:

1. A positive electrode active material for non-aqueous electrolyte secondary battery comprising a lithium-metal composite oxide represented by a general formula (4): $Li_{1+\alpha}Ni_{1-x-y}Co_xMn_yM_zO_{2+\beta}$ (where $-0.05 \leq a \leq 0.50$, $0.02 \leq x \leq 0.3$, $0.02 \leq y \leq 0.3$, $0 \leq z \leq 0.05$, $-0.5 \leq \beta \leq 0.5$, and M is at least one element selected from the group consisting of Mg, Ca, Al, Si, Fe, Cr, V, Mo, W, Nb, Ti, and Zr), wherein

[(D90−D10)/MV] of the positive electrode active material that indicates a dispersion of a particle size in particle size distribution calculated by D90, D10 and the volume average particle diameter (MV) by a laser diffraction scattering method is 0.80 or more, the lithium-metal composite oxide contains a secondary particle formed of primary particles and having a core portion formed of the primary particles which are aggregated inside the secondary particle and a shell portion formed around the core portion, a composition of the core portion in the secondary particle is represented by a general formula (5): $Li_{1+\alpha 1}Ni_{1-x1-y1}Co_{x1}Mn_{y1}M_{z1}O_{2+\beta 1}$ (where $-0.05 \leq a1 \leq 0.50$, $0.7 \leq (1-x_1-y_1) \leq 0.96$, $0 \leq z_1 \leq 0.05$, and $-0.5 \leq \beta_1 \leq 0.5$ are satisfied), a composition of the shell portion in the secondary particle is represented by a general formula (6): $Li_{1+\alpha 2}Ni_{1-x2-y2}Co_{x2}Mn_{y2}M_{z2}O_{2+\beta 2}$ (where $-0.05 \leq a2 \leq 0.50$, $(1-x_1-y_1)/(1-x_2-y_2)>1.0$, $0<(1-x_2-y_2)<0.6$, $0 \leq z_2 \leq 0.05$, $-0.5 \leq \beta_2 \leq 0.5$ are satisfied), and the shell portion has a thickness to be 10% or more and 40% or less of a radius of the secondary particle in a direction from a surface to a center of the secondary particle in the secondary particle having a particle size that is in a range of ±10% of the volume average particle diameter (MV) of the positive electrode active material, and the core portion has a radius to be 60% or more and 90% or less of the radius of the secondary particle in a direction from the center thereof in the secondary particle having the particle size that is in the range of ±10% of the volume average particle diameter (MV) of the positive electrode active material.

2. The positive electrode active material for non-aqueous electrolyte secondary battery according to claim 1, which has a tap density of 2.0 g/cm³ or more and the volume average particle diameter (MV) of 5 μm or more 20 μm or less in the particle size distribution by the laser diffraction scattering method.

3. The positive electrode active material for non-aqueous electrolyte secondary battery according to claim 2, wherein the element M is uniformly distributed inside the lithium-metal composite oxide and/or covers at least a part of a surface of the lithium-metal composite oxide.

4. A method for producing the positive electrode active material for non-aqueous electrolyte secondary battery according to claim 3, the method comprising:

a mixing process of mixing a metal composite hydroxide with a lithium compound to obtain a lithium mixture; and a firing process of firing the lithium mixture in an oxidizing atmosphere at 650° C. or more and 900° C. or less, wherein the metal composite hydroxide is represented by a general formula (1): $Ni_{1-x-y}Co_xMn_yM_z(OH)_{2+\alpha}$ (where $0.02 \leq x \leq 0.3$, $0.02 \leq y \leq 0.3$, $0 \leq z \leq 0.05$, and $-0.5 \leq \alpha \leq 0.5$ are satisfied and M is at least one element selected from the group consisting of Mg, Ca, Al, Si, Fe, Cr, V, Mo, W, Nb, Ti, and Zr), wherein

[(D90−D10)/MV] that indicates a dispersion of a particle size in particle size distribution calculated by D90, D10 and a volume average particle diameter (MV) by a laser diffraction scattering method is 0.80 or more, the metal composite hydroxide comprises a secondary particle formed of primary particles and having a core portion formed of the primary particles which are aggregated inside the secondary particle and a shell portion formed around the core portion, a composition of the core portion is represented by a general formula (2): $Ni_{1-x1-y1}Co_{x1}Mn_{y1}M_z(OH)_{2+\alpha 1}$ (where $0.7 \leq (1-x_1-y_1) \leq 0.96$, $0 \leq z_1 \leq 0.05$, and $-0.5 \leq \alpha_1 \leq 0.5$ are satisfied), a composition of the shell portion is represented by a general formula (3): $Ni_{1-x2-y2}Co_{x2}Mn_{y2}M_z(OH)_{2+\alpha 2}$ (where $(1-x_1-y_1)/(1-x_2-y_2)>1.0$, $0<(1-x_2-y_2)<0.6$, $0 \leq z_2 \leq 0.05$, and $-0.5 \leq a2 \leq 0.5$ are satisfied), and the shell portion has a thickness to be 10% or more and 40% or less of a radius of the particle in a direction from a surface to a center of the secondary particle in the secondary particle having a particle size that is in a range of ±10% of the volume average particle diameter (MV).

5. The method according to claim 4, wherein the metal composite hydroxide has the volume average particle diameter (MV) of 5 μm or more and 20 μm or less.

6. The method according to claim 4, wherein the element M of the metal composite hydroxide is uniformly present inside the secondary particle and/or on a surface of the secondary particle.

7. A method for producing the positive electrode active material for non-aqueous electrolyte secondary battery according to claim 5, the method comprising:

a heat treatment process of subjecting a metal composite hydroxide to a heat treatment;

a mixing process of mixing a lithium compound with at least either of a metal composite hydroxide or a metal composite oxide obtained after the heat treatment to obtain a lithium mixture; and a firing process of firing the lithium mixture in an oxidizing atmosphere at 650° C. or more and 900° C. or less, wherein the metal composite hydroxide is represented by a general formula (1): $Ni_{1-x-y}Co_xMn_yM_z(OH)_{2+\alpha}$ (where $0.02 \leq x \leq 0.3$, $0.02 \leq y \leq 0.3$, $0 \leq z \leq 0.05$, and $-0.5 \leq \alpha \leq 0.5$ are satisfied and M is at least one element selected from the group consisting of Mg, Ca, Al, Si, Fe, Cr, V, Mo, W, Nb, Ti, and Zr), wherein

[(D90−D10)/MV] that indicates a dispersion of a particle size in particle size distribution calculated by D90, D10 and a volume average particle diameter (MV) by a laser diffraction scattering method is 0.80 or more, the metal composite hydroxide comprises a secondary particle formed of primary particles and having a core portion formed of the primary particles which are aggregated inside the secondary particle and a shell portion formed around the core portion, a composition of the core portion is represented by a general formula (2): $Ni_{1-x1-y1}Co_{x1}Mn_{y1}M_{z1}(OH)_{2+\alpha1}$ (where $0.7 \leq (1-x_1-y_1) \leq 0.96$, $0 \leq z_1 \leq 0.05$, and $-0.5 \leq a_1 \leq 0.5$ are satisfied), a composition of the shell portion is represented by a general formula (3): $Ni_{1-x2-y2}Co_{x2}Mn_{y2}M_{z2}(OH)_{2+\alpha2}$ (where $(1-x_1-y_1)/(1-x_2-y_2) > 1.0$, $0 < (1-x_2-y_2) < 0.6$, $0 \leq z_2 \leq 0.05$, and $-0.5 \leq a2 \leq 0.5$ are satisfied), and the shell portion has a thickness to be 10% or more and 40% or less of a radius of the secondary particle in a direction from a surface to a center of the secondary particle in the particle having a particle size that is in a range of +10% of the volume average particle diameter (MV).

8. The method according to claim 7, wherein the metal composite hydroxide has the volume average particle diameter (MV) of 5 μm or more and 20 μm or less.

9. The method according to claim 7, wherein the element M of the metal composite hydroxide is uniformly present inside the secondary particle and/or on a surface of the secondary particle.

10. A non-aqueous electrolyte secondary battery comprising a positive electrode containing the positive electrode active material according to claim 1, a negative electrode, and a non-aqueous electrolyte.

11. The positive electrode active material for non-aqueous electrolyte secondary battery according to claim 1, wherein a thickness of the shell portion is 0.2 μm or more and 1.6 μm or less in the direction from the surface to the center of the secondary particle.

\* \* \* \* \*